United States Patent
Mantovano et al.

(10) Patent No.: US 10,100,751 B2
(45) Date of Patent: Oct. 16, 2018

(54) METHODS AND SYSTEMS FOR CLEARING THROTTLE OBSTRUCTION

(71) Applicant: Ford Global Technologies, LLC, Dearborn, MI (US)

(72) Inventors: Gianluca Mantovano, Oak Park, MI (US); Dev Saberwal, Canton, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 15/239,575

(22) Filed: Aug. 17, 2016

(65) Prior Publication Data

US 2018/0051635 A1    Feb. 22, 2018

(51) Int. Cl.
  *F02D 11/10* (2006.01)
  *F02B 37/00* (2006.01)
  *F02M 31/02* (2006.01)

(52) U.S. Cl.
  CPC ............ *F02D 11/107* (2013.01); *F02B 37/00* (2013.01); *F02M 31/02* (2013.01); *F02D 2011/108* (2013.01); *F02D 2200/0404* (2013.01)

(58) Field of Classification Search
  CPC ................. F02D 11/107; F02D 11/105; F02D 2011/108; F02D 2011/0404; F02D 2200/0404; F02D 41/22; F02B 37/00; F02B 77/082; F02M 31/02

USPC ............ 701/103, 107, 110; 123/399, 198 D; 73/114.31, 114.36

See application file for complete search history.

(56) References Cited

U.S. PATENT DOCUMENTS

| | | | | |
|---|---|---|---|---|
| 5,303,581 A | * | 4/1994 | McQueen | F02D 11/107 73/114.36 |
| 5,976,056 A | * | 11/1999 | Matsumoto | B60W 30/18 477/125 |
| 6,701,891 B2 | * | 3/2004 | Niki | F02D 11/107 123/396 |
| 7,114,487 B2 | * | 10/2006 | Hedrick | F02D 11/107 123/399 |
| 7,434,565 B2 | * | 10/2008 | Miyachi | F02D 41/107 123/361 |
| 7,503,311 B2 | * | 3/2009 | Nichols | F02D 11/107 123/361 |
| 7,509,939 B2 | | 3/2009 | Asano et al. | |

* cited by examiner

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Methods and systems are provided for detecting throttle obstructions in a vehicle. In one example, after engine start up, throttle icing condition resulting from the throttle capturing ice fragments originally formed within a charge air cooler or an intake passage upstream of throttle, may be detected. Responsive to detecting the throttle icing condition, the throttle may be adjusted to a fully open position independent of accelerator pedal position, and maintained at the fully open position for a threshold duration while maintaining a desired torque, to release the captured ice fragments from the throttle.

6 Claims, 9 Drawing Sheets

Ice breaking routine

Ice passing routine

METHODS AND SYSTEMS FOR CLEARING THROTTLE OBSTRUCTION

FIELD

The present description relates generally to methods and systems for controlling a throttle valve of a vehicle engine to remove ice present on the throttle valve.

BACKGROUND/SUMMARY

As recognized by the inventors herein, engines may utilize a turbocharger or supercharger to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. If the air at an inlet of the compressor is humid, which may occur due to one or more conditions such as humid or rainy weather conditions, decrease in ambient temperature, exhaust gas recirculation, and crankcase ventilation, water vapor may condense on the surfaces of the CAC when the intake air is cooled below the water dew point temperature. Further, when the charge air entering the CAC is boosted (e.g., an induction pressure and boost pressure are greater than atmospheric pressure), condensate may form if the CAC temperature falls below the dew point temperature. As a result, during vehicle operation, condensate may collect at the bottom of the CAC, or in the internal passages of the CAC. After a vehicle cold soak (e.g., long drive followed by an overnight soak at freezing ambient temperatures), the condensate collected within the CAC may freeze and form ice.

When the engine is started after the vehicle cold soak, ice formed in the CAC may loosen, which may eventually break free from the CAC during engine operation. During some conditions, the ice fragments that have broken free from the CAC may be captured by the throttle, resulting in icing of the throttle.

One example approach for clearing throttle-icing conditions is shown in U.S. Pat. No. 7,509,939. Therein, the throttle valve is opened and closed repeatedly in an attempt to break the ice on or around the throttle valve. However, the inventors herein have recognized potential issues with such methods. For example, the '939 patent assumes a throttle valve jammed due to ice formed on or around the throttle. In order to fracture the ice, the throttle valve is subjected to torque reversals wherein the throttle is swung back and forth repeatedly in the opening and closing directions. While attempts are made to break the ice on the ice-jammed throttle, the torque reversals do not provide sufficient time for ice particles that have broken free from the CAC and subsequently captured by the throttle to be released from the throttle. Thus, ice particles from the CAC that are captured by the throttle continue to remain on the throttle, which may impede desired throttle operation and therefore, may cause the engine to operate in a failure management mode, which severely limits engine power and causes customer dissatisfaction.

In one example, the issues described above may be addressed by a method for an engine, comprising: in response to detecting a throttle obstruction, adjusting a throttle to a fully open position; maintaining the throttle at the fully open position for a threshold duration while maintaining a desired torque; and after the threshold duration, adjusting the throttle to a desired position, the desired position based on the desired torque; wherein the throttle obstruction is detected after engine start up. In this way, by detecting the throttle obstruction after engine start up is completed, throttle obstruction resulting from ice originating from the CAC and captured by the throttle may be detected. Further, by adjusting the throttle to the fully open position, air flow through the throttle is increased, which reduces the throttle's grip on the ice fragments. Still further, by maintaining the throttle at the fully open position for a threshold duration, sufficient release time is provided for the ice fragments captured by the throttle to be released from the throttle.

As one example, during engine operation after engine startup, throttle obstruction wherein the throttle has captured ice particles, such as ice particles that detach from upstream of the throttle (e.g., in CAC) and get captured by the throttle during vehicle operation, may be detected by a controller by operating the throttle valve via a throttle motor to reach a fully closed position independent of an accelerator pedal position from a current position, and comparing the rotation speed to an expected threshold speed. Upon determining that the throttle valve has captured ice particles, the controller may signal the throttle motor to open the throttle valve to a fully open position, independent of the accelerator pedal position. After reaching the fully open position, which may be confirmed based on an indication from a throttle position sensor, the throttle valve may be maintained at the fully open position for a threshold duration. By maintaining the throttle valve at the fully open position, the ice particles captured by the throttle may be released from the throttle valve due to the increase in air flow. While the throttle is maintained open at the fully open position for the threshold duration, one or more torque reducing measures, such as spark retard, cylinder deactivation, lean fueling, displacement reduction, etc., may be undertaken to reduce any excess engine torque. Subsequently, after the threshold duration has passed, the throttle valve may be commanded to a desired position based on torque demand by a vehicle operator, which may be based on the accelerator pedal position.

In this way, by maintaining the throttle at the fully open position, airflow rate through the throttle valve may be increased, which may facilitate the removal of ice particles deposited on the throttle during engine startup after vehicle cold soak.

Torque reversals are effective for a given type of throttle icing, but are not effective for icing that can be resolved by opening the throttle during significant air flow that allows a trapped lozenge of ice (which formed upstream of the throttle) to be swept downstream of the throttle. Previous solutions have focused on crushing adhered ice. This solution adds the mitigating action of releasing the throttle's grip on unattached ice.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for detecting and clearing a throttle obstruction due to ice formation within a charge air cooler (CAC). A boosted engine system, such as the engine system shown in FIG. 1A, may include a compressor, CAC, and throttle. Throttle is further depicted in FIG. 1B, and open, default, and closed positions of the throttle are depicted in FIGS. 2A, 2B, and 2C. An example first throttle obstruction due to ice formation on and/or around the throttle is shown at FIG. 2D. An example second throttle obstruction due to ice captured by the throttle is shown at FIG. 2E. An engine controller may perform routines shown in FIGS. 3-7 to detect and clear the first and second throttle obstructions. While the first throttle obstruction may be detected and cleared at or during engine start up, the second throttle obstruction may be detected and cleared after engine start up. Specifically, in order to clear the second obstruction, the engine controller may signal a throttle motor to adjust the throttle to a fully open position and maintain the fully open position for a threshold duration while maintaining a desired torque by one or more torque reduction measures. An example operating sequence for detecting and clearing the first and second throttle obstructions is shown at FIG. 8.

Figure 1A:
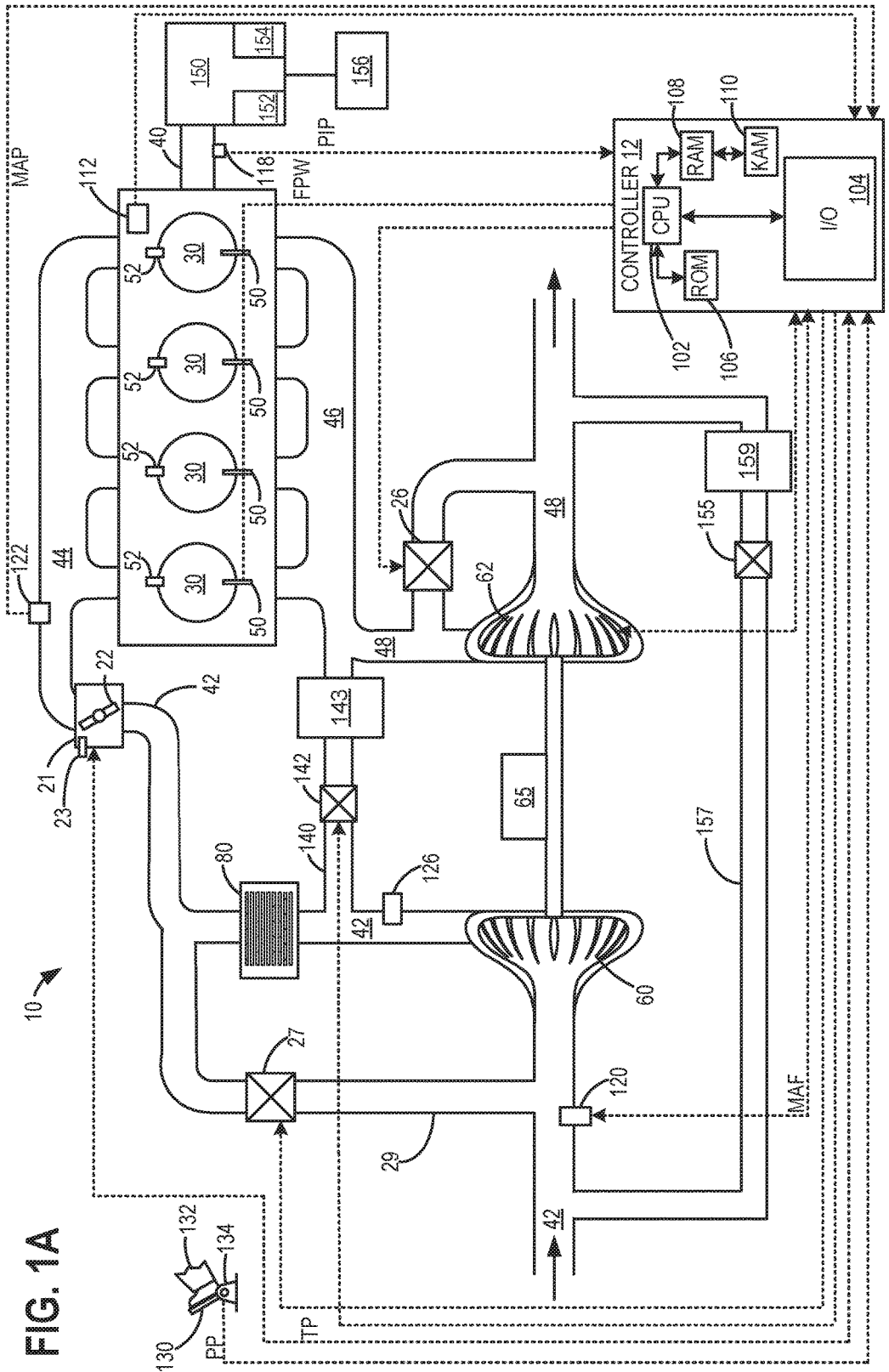
FIG. 1A is a schematic diagram of an example engine system including a throttle and a charge air cooler.

FIG. 1A is a schematic diagram showing an example engine 10, which may be included in a propulsion system of an automobile. The engine 10 is shown with four cylinders or combustion chambers 30. However, other numbers of cylinders may be used in accordance with the current disclosure. In another example, the engine 10 may be a V-engine with two banks of cylinders 30. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque). As the transmission shifts to a lower gear, the engine speed (Ne or RPM) increases, increasing engine airflow. An intake manifold vacuum generated by the spinning engine may be increased at the higher RPM.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark timing may be retarded to reduce engine torque. In another example, spark may be retarded during a tip-in. In an alternate embodiment, compression ignition may be used to ignite the injected fuel.

The intake manifold 44 may receive intake air from an intake passage 42. An engine intake of the engine 10 includes the intake manifold 44 and the intake passage 42. The intake passage 42 and/or intake manifold 44 includes a throttle 21 having a throttle plate 22 to regulate flow to the intake manifold 44. Throttle 21 includes a throttle position sensor (TPS) 23 that provides an indication of a position (TP) of the throttle to the controller 12. In this particular example, the position (TP) of the throttle plate 22 may be varied by the controller 12 via a throttle motor to enable electronic throttle control (ETC). In some embodiments, a throttle plate position controller (not shown) communicating with controller 12 may adjust operation of throttle motor 25 to adjust position of throttle plate 22.

Figure 1B:
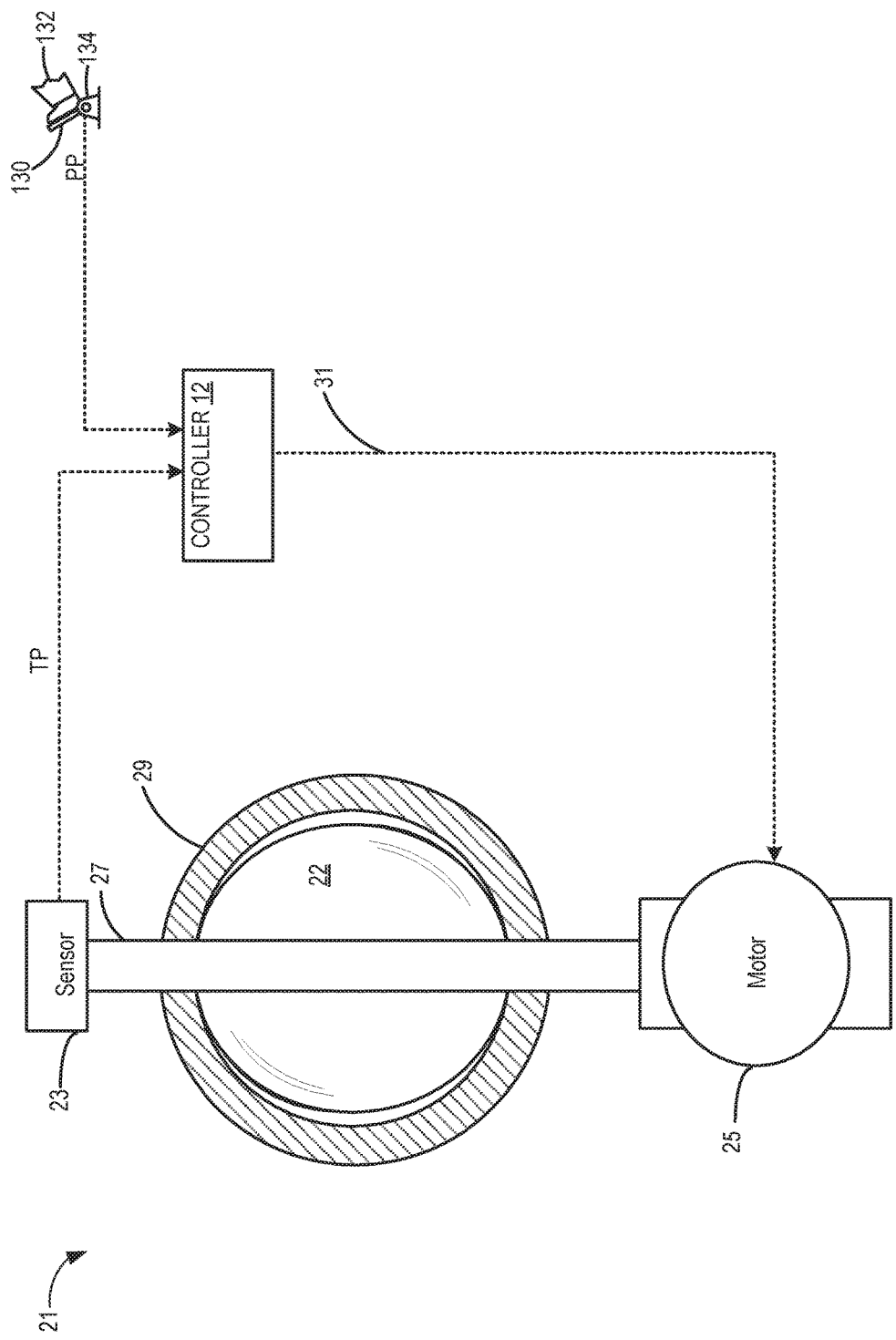
FIG. 1B is a schematic diagram of a throttle included in the engine system of FIG. 1A.
Figures 2A, 2B, 2C:
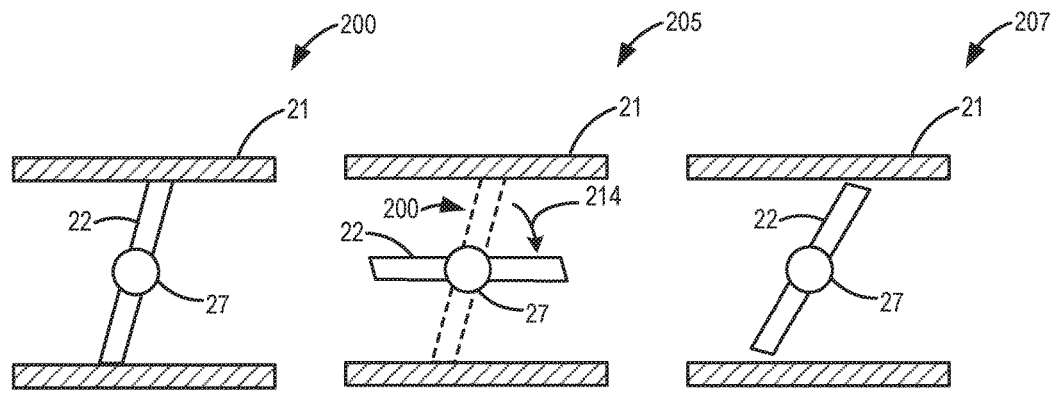
FIG. 2A shows a cross-sectional diagram of a throttle bore illustrating a throttle plate in a closed position.
FIG. 2B shows a cross-sectional diagram of a throttle bore illustrating a throttle plate in a default position.
FIG. 2C shows a cross-sectional diagram of a throttle bore illustrating a throttle plate in an open position.
Figure 2D:
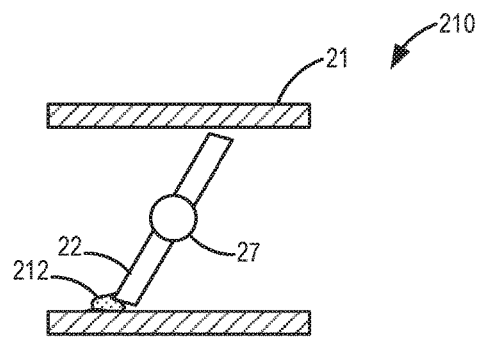
FIG. 2D shows a cross-sectional diagram of a throttle bore illustrating an example first throttle plate obstruction due to ice formation on and/or around the throttle.
Figure 2E:
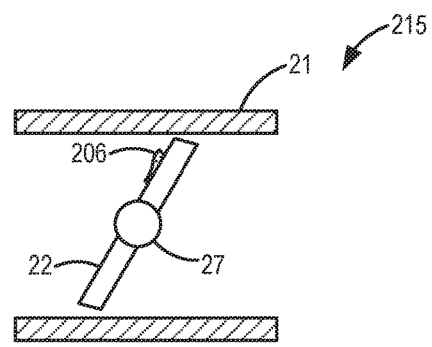
FIG. 2E shows a cross-sectional diagram of a throttle bore illustrating an example second throttle plate obstruction due to ice captured by the throttle during engine operation.

Throttle 21 is further illustrated at FIG. 1B. Throttle 21 includes a throttle body 29 and a throttle plate 22 within throttle body 29. Throttle plate 22 moves within throttle body as a throttle shaft 27 turns. Throttle shaft 27 is coupled to throttle body 29. Throttle plate 22 is coupled across a portion of throttle shaft 27 within throttle body 29. Further, a first end of throttle shaft 27 is coupled to throttle position sensor 23, and a second end of throttle shaft 27 is coupled to throttle motor 25.

Throttle motor 25 rotates throttle plate 22 to a desired position. In one example, throttle motor 25 may move throttle plate 22 via a gear train (not shown). Throttle motor 25 moves in response to signals or commands received from controller 12. The commands for moving throttle plate 22 may be based on a position of accelerator pedal 130. For example, a vehicle operator 132 may depress the accelerator pedal 130. An indication of an amount of depression of accelerator pedal and therefore, position of accelerator pedal (PP) is provided to controller 12 by a pedal position sensor 134. Based on the indication from pedal position sensor 134, controller 12 may provide a signal 31 (which may be an electrical signal, such as a voltage or a current signal) to throttle motor 25 to increase or decrease an opening amount of throttle by adjusting the position of throttle plate 22. For example, throttle motor 25 may provide torque to throttle shaft 27 (an amount of torque based on the signal 31) in order to rotate throttle plate 22. Thus, signal 31 is a commanded signal based on a desired throttle position determined by the controller, where the desired throttle position is based on the position of the accelerator pedal. The throttle position commanded by the controller based on the desired throttle position (and hence, based on the accelerator pedal position) is a commanded throttle position. In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

Further, as indicated above, the throttle position or throttle angle of the throttle 21 may be determined with throttle position sensor 23 positioned at the throttle 21. Throttle position when the throttle plate 22 is completely closed (and blocking airflow through the intake passage 42), is referred to herein as fully closed position. A fully closed position 200 of the throttle 21 is depicted at FIG. 2A. Throttle position when the throttle plate 22 allows maximum airflow towards the engine through the intake passage is referred to herein as the fully open position. A fully open position 205 of the throttle 21 is depicted at FIG. 2B. Throttle plate 22 may be rotated about throttle shaft 27 by throttle motor 25 in an opening direction (also referred to as a first direction) indicated by arrow 214 at FIG. 2B to permit more air towards the engine through the intake passage 42. Throttle plate 22 may be rotated by throttle motor 25 in a closing direction (also referred to as a second direction) opposite to the opening direction 214 to reduce air flow towards the engine through the intake passage 42.

Throttle 21 may also have a default position. At the default position, throttle 21 may be slightly open than at the fully closed position. Thus, the default position may be a more closed position (not fully closed) wherein a threshold amount of air flow is permitted through the intake manifold towards the engine. When the motor 25 is unpowered, the throttle 21 may be in the default position. The default position may be achieved through a mechanism (including a lever and a spring, for example; not shown) that allows the throttle 21 to remain slightly open when the motor is unpowered. Thus, when the vehicle is in an example an OFF condition and the throttle motor 25 is unpowered, the throttle is at the default position. An example default position 207 of the throttle 21 is depicted at FIG. 2C.

During icing conditions, such as during a cold soak conditions after the vehicle engine has operated for a duration greater than a threshold duration, the ambient temperature is below a threshold temperature, high ambient humidity etc., ice may form on and/or around throttle, which may cause the throttle movement (that is, rotation) to be obstructed. Ice formation on and/or around the throttle that causes the throttle to be jammed and obstructs throttle plate rotation is herein referred to as first throttle obstruction. An example of the first throttle obstruction is depicted at FIG. 2D. Specifically, FIG. 2D shows ice 212 formed on the throttle plate 22 and the throttle body that reduces a rotational movement of the throttle.

Further, during icing conditions, condensation within the CAC may cause ice formation within the CAC. In other words, ice formation may occur in a water-accumulated area of a charge air cooler tube, which may cause throttle obstruction during certain engine operating conditions. For example, turbocharged engine compress air and then cool the pressurized air utilizing a charge air cooler. When air at the compressor inlet is humid (due to one or more of higher ambient humidity, increased crankcase ventilation, and increased exhaust gas recirculation), condensation may occur on the surfaces of the CAC, which may subsequently accumulate in valleys (depressions) present in the CAC tube. After a vehicle cold soak period (e.g., long drive, followed by an overnight soak at ambient temperatures below a threshold ambient temperature), the accumulated water in the CAC tube may freeze. During a subsequent engine start-up after the vehicle cold soak period, air flow through the CAC may cause one or more ice slivers to detach from the CAC tube. When the one or more detached ice slivers pass through the throttle valve, the slivers may be captured by the throttle, which results in a throttle-captured ice condition. For example, a lozenge of ice that formed 4 to 20 inches upstream of the throttle may be "bit down" by the throttle, as the lozenge of ice breaks loose and gets swept down the intake passage. Due to the throttle capturing ice formed upstream of the throttle, throttle movement may be obstructed. Thus, in one example, the throttle-captured ice condition is based on ice originating from the CAC and not due to formation of ice on and/or around the throttle. While the above example describes the throttle capturing ice formed within the CAC, it will be appreciated that the throttle may capture ice formed upstream of the throttle that breaks loose, and is swept towards the throttle due to air flow through the intake passage. The throttle-captured ice condition is referred to herein as second throttle obstruction. An example second throttle obstruction is depicted at FIG. 2E. Specifically, FIG. 2E shows an ice sliver 206 captured by the throttle plate 22 that causes the second obstruction.

Details of detecting the first and second throttle obstructions, and clearing the first and second throttle obstructions, will be discussed below with respect to FIGS. 3-8.

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 157. A low pressure EGR valve 155 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler 80. For example, the low pressure EGR passage 157 may include a low pressure EGR cooler 159 and the high pressure EGR passage 140 may include a high pressure EGR cooler 143.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12. For example, as shown in FIG. 1A, the engine 10 may include an electric turbocharger assist device 65. The electric turbocharger assist device 65 may be chargeable and then provide power to the compressor 60 when increased boost is required. As such, the electric turbocharger assist device may enable the compressor 60 to reach a desired rotational speed for delivering required boost more quickly than if the turbine 62 alone was providing driving power to the compressor 60. In another example, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass valve (CBV) 27 configured to divert intake air around the compressor 60. As shown in FIG. 1, the CBV 27 may be positioned in a bypass passage 29 bypassing the compressor 60 and the CAC 80. Specifically, an air inlet to the bypass passage 29 may be downstream of the CAC 80 and an air outlet from the bypass passage 29 and to the intake passage 42 may be upstream of the compressor 60. As such, when the CBV 27 is opened, charge air may be diverted from downstream of the CAC 80 to upstream of the compressor 60. The wastegate 26 and/or the CBV 27 may be controlled by the controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

The intake passage 42 may further include the charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. As mentioned above, during icing conditions, the condensate may freeze within the CAC. During a subsequent engine operation, due to air flow through the CAC, ice formed within the CAC may fracture, causing ice fragments from the CAC to be carried along with air flow through the intake towards the engine. Some of the ice fragments, when passing through the throttle opening may be captured by the throttle, which may cause throttle obstruction. Details of detecting and clearing the throttle obstruction caused due to ice captured by the throttle, wherein the CAC is the source of the ice, will be further discussed below.

The engine 10 may further include one or more oxygen sensors positioned in the intake passage 42 and/or the intake manifold 44. The intake manifold 44 includes a MAP sensor 122 for measuring an absolute manifold pressure (MAP). As discussed further below, the output of the MAP sensor 122 may be used to estimate other engine system pressures such as BP. In some embodiments, the intake passage 42 may include a boost pressure sensor 126. However, in other embodiments, the intake passage may not include the boost pressure sensor 126. Additionally, a mass air flow (MAF) sensor 120 may be positioned in the intake passage 42, upstream of the compressor 60.

The controller 12 is shown in FIG. 1A as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from the MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; an ambient humidity from an ambient humidity sensor (not shown) coupled to the vehicle; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. The MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors not depicted may also be present, such as a sensor for determining ambient air temperature and/or humidity, and other sensors. In one example, the ambient air temperature sensor and/or the ambient humidity sensor may be positioned within intake passage 42. Additionally or alternatively, the ambient temperature and/or the ambient humidity sensor may be positioned on an external surface of the vehicle. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 3-7.

In one example, engine 10 may be a variable displacement engine (VDE) capable of operating in a VDE mode wherein one or more cylinders are selectively deactivated. For example, engine 10 may be a V-engine wherein combustion chambers 30 are arranged into a first bank of cylinders and a second bank of cylinders. In another example, engine 10 may be an in-line engine (as shown in FIG. 1A) wherein one or more cylinders may be selectively deactivated (e.g., any number of cylinders may be deactivated). As one example, during low engine loads when the full torque capability of the engine is not needed, one or more cylinders 30 of the engine 10 (or of a selected engine bank) may be selectively deactivated (herein also referred to as a VDE mode of operation). This may include deactivating fuel and/or spark on the selected engine cylinder(s) or cylinder bank. Specifically, one or more cylinders or one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. This requires higher manifold pressures, resulting in lowered pumping losses and increased engine efficiency. Also, the lower effective surface area (from only the enabled cylinders) exposed to combustion reduces engine heat losses, improving the thermal efficiency of the engine. In one example, an engine controller may selectively deactivate all the cylinders of a given engine bank during shift to a VDE mode and then reactivate the cylinders during a shift back to a non-VDE mode. In another example, the controller may selectively deactivate a subset of a total number of engine cylinders 10 during VDE mode. During the deactivation, the controller may increase boost, thereby increase the manifold pressure and allowing the active engine cylinders to deliver the required torque.

During engine operating conditions, when a throttle obstruction is detected, such as throttle captured icing (that is, second throttle obstruction), the controller may signal (command) the throttle to operate in a fully open position independent of the accelerator pedal position. During such conditions, in order to reduce excess torque, the engine may be operated in the VDE mode wherein one or more cylinders may be deactivated. The one or more cylinders may be deactivated by deactivating fuel and/or spark as discussed above. Additionally or alternatively, the one or more cylinders may be deactivated by deactivating intake and/or exhaust valves on the one or more cylinders. The cylinder valves may be deactivated via hydraulically actuated lifters coupled to valve push rods, or via a cam profile switching mechanism in which a cam lobe with no lift is used for the deactivated valves. Still other valve deactivation mechanisms may be used, such as electrically actuated valves. Additionally or alternatively, other torque reduction measures, such as retarding a spark timing from MBT, and providing a more lean air-fuel ratio than stoichiometry may be used. Further, additionally or alternatively, the controller may vary the transmission gear to a higher gear to reduce an amount of torque conveyed across the transmission and torque converter to vehicle wheels 156 (that is, an engine shaft output torque).

Figure 3:
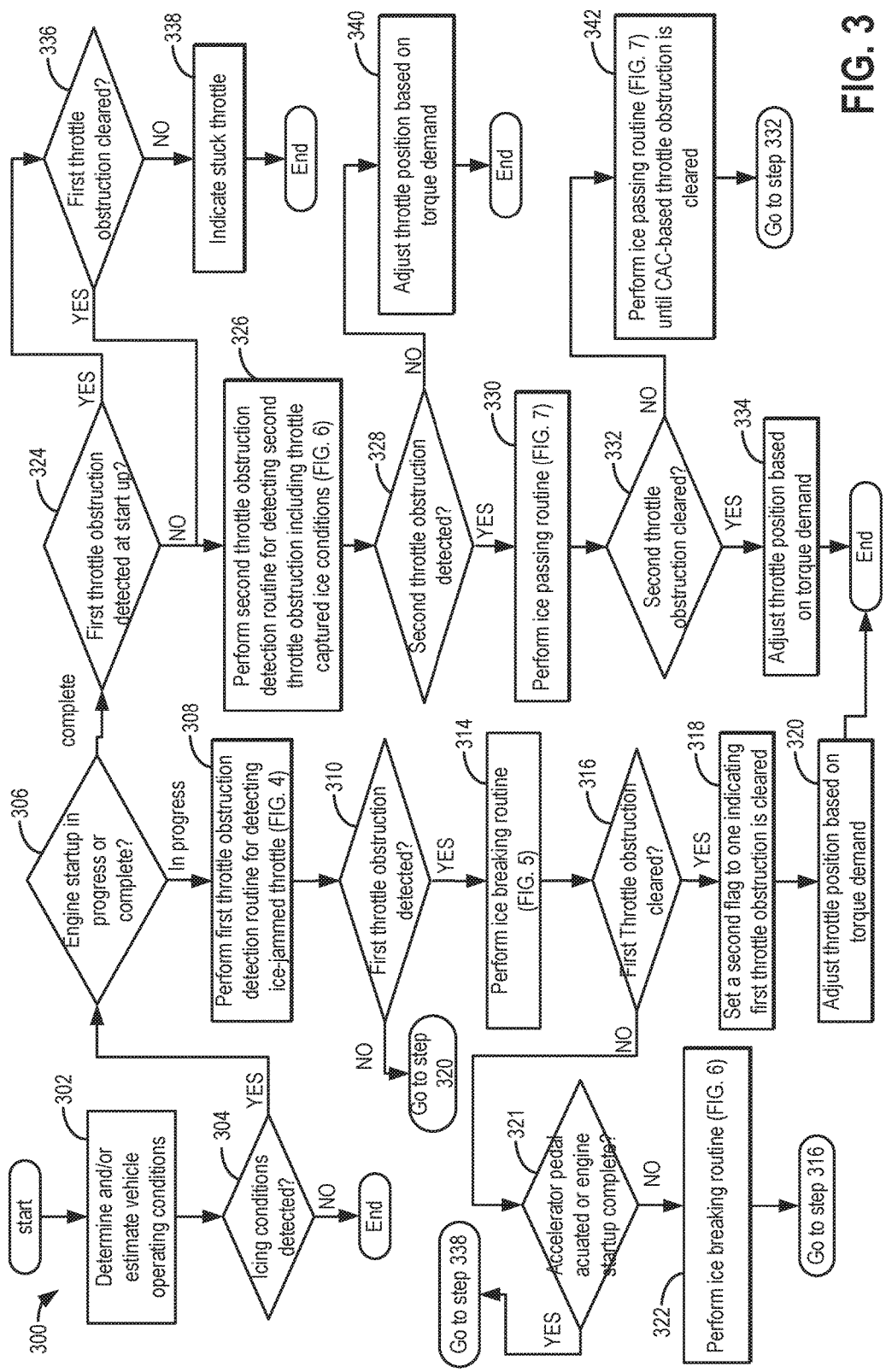
FIG. 3 shows a high-level flow chart illustrating an example routine for detecting throttle obstruction and clearing the detected obstruction.

Turning to FIG. 3, it shows a flowchart illustrating a method 300 for detecting a first throttle obstruction and/or a second throttle obstruction of a throttle, such as throttle 21 at FIGS. 1A-2E, in vehicle system including a boosted engine, such as engine 10 at FIG. 1A, and clearing the first and/or second throttle obstructions. Instructions for carrying out method 300 and other methods included herein may be executed by a controller of the vehicle system, such as controller 12 at FIGS. 1A and 1B, based on instructions stored in non-transitory memory of the controller, and in conjunction with signals received from sensors of the vehicle system, such as the sensors described above with reference to FIGS. 1A-2E. The controller may employ actuators of the vehicle system, such as the actuators described with reference to FIGS. 1A-2E, to clear the throttle obstruction and adjust vehicle operation, according to the methods described below. Specifically, the first throttle obstruction may be detected by the controller before engine start at key ON or during engine start up, and the second throttle obstruction may be detected by the controller any time after engine start up. Further, in response to detecting the first throttle obstruction, a first sequence of throttle operations may be performed based on instructions stored in the controller to clear the first throttle obstruction.

In response to detecting the second throttle obstruction, a second sequence of throttle operations that are different from the first sequence of throttle operations may be performed based on instructions from the controller to clear the second throttle obstruction. While method 300 is described with reference to the systems depicted in FIGS. 1A-2E, it should be understood that method 300 or similar methods may be applied to other systems without departing from the scope of this disclosure.

Method 300 begins at 302. At 302, method 300 includes determining vehicle operating conditions. The vehicle operating conditions may be estimated and/or measured based on signals received from one or more sensors, such as sensors described with respect to FIGS. 1A and 1B. The vehicle operating conditions may include engine operating conditions. The engine operating conditions may include ignition key position, engine speed, engine load, torque demand, throttle position, mass airflow rate, exhaust gas recirculation rate, cam position, ambient temperature, intake air charge temperature, engine coolant temperature, ambient humidity, crank case ventilation flow, etc.

Upon determining the vehicle operating conditions, method 300 proceeds to 304. At 304, method 300 includes judging if conditions for formation of ice are present. Ice formation may occur on or around the throttle valve. Additionally, ice formation may occur in a water-accumulated area of a charge air cooler tube, which may cause throttle obstruction during certain engine operating conditions. For example, turbocharged engine compress air and then cool the pressurized air utilizing a charge air cooler. When air at the compressor inlet is humid (due to one or more of higher ambient humidity, increased crankcase ventilation, and increased exhaust gas recirculation), condensation may occur on the surfaces of the CAC, which may subsequently accumulate in valleys (depressions) present in the CAC tube. After a vehicle cold soak period (e.g., long drive, followed by an overnight soak at ambient temperatures below a threshold ambient temperature), the accumulated water in the CAC tube may freeze. During a subsequent engine start-up after the vehicle cold soak period, air flow through the CAC may cause one or more ice slivers to detach from the CAC tube. When the one or more detached ice slivers pass through the throttle valve, the ice slivers may hit the throttle and shatter due to the impact, slip through the throttle opening, or be captured by the throttle. When the throttle captures the ice slivers detached from the CAC, it results in a throttle-captured ice condition. Thus, in one example, the throttle-captured ice condition is based on ice originating from the CAC and not due to formation of ice on and/or around the throttle that results in a throttle jammed condition. Therefore, the throttle-captured ice condition may be detected when intake air flows from the CAC through the throttle into the intake manifold. Thus, while ice formed on and/or around the throttle may be detected before engine start up, at start up or during start up, the throttle-captured ice conditions may be detected anytime during vehicle operation after engine start up when the engine is running. Further, in some examples, ice formed on and/or around the throttle may break free due to ice-breaking routines performed before start up is complete as discussed below and the broken ice particles may be captured may be captured by the throttle resulting in the throttle captured ice condition.

Accordingly, conditions for formation of ice may include one or more of ambient humidity above a threshold humidity, previous duration of engine operation greater than a threshold duration, an amount of airflow inducted through the intake manifold (and throttle) greater than a threshold amount during the previous duration of engine operation, EGR mass flow during the previous duration of engine operation, cruising speed of the vehicle during the previous duration of engine operation, duration of the cruising speed, current intake air charge temperature below a threshold intake air charge temperature, current ambient temperature below a threshold temperature, vehicle cold soak duration greater than a threshold duration between previous engine operation and current engine operation, vehicle cold soak temperature less than a threshold cold soak temperature, throttle icing in and around the throttle during current engine start up, and duration of current engine operation less than a threshold duration of engine operation, and duration of current engine operation with boost less than a threshold boosted operation duration.

If one or more icing conditions are detected at 304, method 300 proceeds to 306. Otherwise, if the controller judges that the one or more icing conditions are not present, method 300 proceeds to exit.

At 306, method 300 includes determining if an engine startup is in progress or completed. For example, when a key on ignition event is detected (e.g., vehicle ignition key changed to ON state from an OFF state) it may be determined that the engine start up is in progress. Further, the controller may determine that the engine startup is in progress based on the engine speed during a period when the engine speed has not stabilized to an idle speed after key-on. Still further, it may be determined that the engine startup is in progress based on a current engine coolant temperature less than a threshold start up coolant temperature. Further, it may be determined that the engine startup is in progress when a door switch is actuated before the ignition key is turned to an ON state (PCM power-up mode).

Engine startup may be determined complete when the engine speed stabilizes at the idle speed following start-up. Additionally or alternatively, engine start up may be determined to be complete when an operator actuates an accelerator pedal. Still further, in some examples, additionally engine start up may be determined complete when the engine coolant temperature is above the threshold coolant temperature.

Engine speed may be determined based on an indication from a sensor, such as Hall effect sensor 118 at FIG. 1A. Engine coolant temperature may be determined based on an indication from an engine coolant temperature sensor, such as sensor 112 at FIG. 1A. Accelerator pedal actuation may be determined based on an indication from a pedal position sensor, such as sensor 134 at FIGS. 1A and 1B.

If it is determined that the engine start-up is in progress at 306, method 300 proceeds to 308. At 308, method 300 includes performing a first throttle obstruction detection. The first throttle obstruction detection may be performed to detect ice that is formed on and/or around the throttle, such as throttle obstruction shown at FIG. 2D. Thus, the first obstruction detection may identify an ice-jammed throttle due to ice formed on and/or around the throttle prior to engine start up. The first obstruction detection may be performed at or during the engine startup. The first obstruction detection may not be performed after start-up is completed. For example, the first obstruction detection may be performed during engine operating conditions discussed above, such as, one or more of an engine coolant temperature below the threshold coolant temperature, intake air charge temperature (determined based on an indication from an intake air charge temperature sensor positioned within the intake manifold, for example) below a threshold air charge temperature, PCM wake-up mode when a vehicle door switch is actuated and before the ignition key is turned on, after ignition key is turned on and until accelerator pedal is actuated, and a threshold duration after the ignition key is turned on. Details of performing the first throttle obstruction detection to detect an ice-jammed throttle due to formation of ice on and/or around the throttle that restricts the movement of the throttle will be described below with respect to FIG. 4.

Next, method 300 proceeds to 310. At 310, method 300 includes judging if the first throttle obstruction is detected. For example, it may be judged that the first throttle obstruction is detected based on a status of a first throttle obstruction flag. As an example, if the first throttle obstruction flag is set to 1, it may be judged that the first throttle obstruction is detected, otherwise, it may be judged that the throttle is not obstructed with ice on or around the throttle. If the answer at 310 is YES, the first throttle obstruction is detected and the throttle is obstructed with ice formed on and/or around the throttle, and method 300 proceeds to 314. Otherwise, if the first throttle obstruction is not detected, method 300 proceeds to step 320. At 320, method 300 includes adjusting throttle based on torque demand. Adjusting throttle based on torque demand includes adjusting the throttle position based on an accelerator pedal position. For example, as the accelerator pedal depression increases, an opening of the throttle may be increased to increase air flow to the engine. If the accelerator pedal is not depressed, the throttle may be adjusted to the default position.

At 314, upon detecting first throttle obstruction, method 300 includes performing ice breaking routine to clear the first throttle obstruction. Performing ice breaking routine includes performing torque reversals on the throttle motor to open and close the throttle to break free from the obstruction. Details of performing the ice breaking routine will be further described with respect to FIG. 5.

Next, at 316, method 300 includes judging if the first throttle obstruction is cleared. The first throttle obstruction may be determined cleared based on an angular displacement of the throttle. In one example, the first throttle obstruction may be determined cleared based on the angular displacement of the throttle from a default position to fully closed position equal to a threshold angular displacement or within a threshold limit from the threshold angular displacement taking into account throttle wear over time. The threshold displacement may be a predetermined value based on angular displacement of an unobstructed throttle. The threshold displacement may be stored within a look-up table in a memory of the controller.

If the first throttle obstruction is cleared, then the answer at 316 is YES and method 300 proceeds to 318. At 318, the status of a second flag indicating that the first throttle obstruction is cleared may be set to one. For example, an initial status of the second flag for clearing throttle obstruction may be set to zero. In response to the first throttle obstruction being cleared, the second flag may be set to one. Thus, at 318, the status of the first flag for detecting first throttle obstruction is one indicating that the first throttle obstruction was detected during start up before the start up was completed and the status of the second flag is one indicating that the first obstruction that was detected during startup is cleared.

Upon setting the second flag to one, method 300 proceeds to 320. At 320, method 300 includes adjusting throttle position based on torque demand. Method 300 may then end.

Returning to 316, if the first throttle obstruction is not cleared, then the answer at 316 is NO and method 300 proceeds to 321. At 321, method 300 includes judging if one or more conditions are satisfied. The one or more conditions include the accelerator pedal actuated condition and engine start up completed condition. Accordingly, if the accelerator pedal is actuated and/or if the engine start up is completed before the first throttle obstruction is cleared, method 300 proceeds to 338. At 338, method 300 includes indicating a stuck throttle. For example, upon determining that the first throttle obstruction is not cleared before engine startup is completed, the controller may activate a diagnostic trouble code (DTC) corresponding to the nature of fault detected (e.g., the controller may activate a DTC for stuck throttle). As such, the DTC may be readable by a universal diagnostic code reader of a kind known in the art. Further, in some examples, the fault detected may be indicated to a vehicle operator. In one example, the indicator may be visual, e.g., an illuminated signal on a dashboard of the vehicle. In another example, the indicator may be audible.

If the accelerator pedal is not actuated or the engine start up is not complete, method 300 proceeds to 322. At 322, method 300 includes repeating the ice breaking routine as discussed below at FIG. 6. Method 300 may then return to 316 to determine if the first throttle obstruction is cleared based on the angular displacement of the throttle as discussed above.

Returning to 306, if the engine startup is determined complete upon confirming icing conditions, method 300 proceeds to 324. At 324, method 300 includes determining if first throttle obstruction is detected during engine operating conditions before the completion of startup. The controller may determine that the first throttle obstruction was detected before start up based on the status of the first flag for throttle obstruction. For example, if the first flag for first throttle obstruction was set to zero, it may be determined that the first throttle obstruction was not detected before engine startup was completed. If the first flag for first throttle obstruction was set to one, it may be determined that the first throttle obstruction was detected at or during engine start up before the engine startup was completed. If it is confirmed that the first throttle obstruction was detected at startup, the answer at 324 is YES and method 300 proceeds to 336. At 336, method 300 includes judging if the first throttle obstruction was cleared before startup. It may be determined that the first throttle obstruction was cleared before start up based on the status of the second flag for clearing throttle obstruction. For example, if the second flag for first throttle obstruction was set to zero, it may be determined that the first throttle obstruction was not cleared before completion of engine start up. If the second flag for first throttle obstruction was set to one, it may be determined that the first throttle obstruction was cleared during engine start up before completion of the engine start up. At 336 if it is confirmed that the first throttle obstruction was not cleared before the completion of engine start up, method 300 proceeds to 338. At 338, method 300 includes indicating a stuck throttle. For example, a throttle malfunction may be indicated via a DTC for stuck throttle as discussed above. At 336 if it is confirmed that the first throttle obstruction was cleared before the completion of engine start up, method 300 proceeds to 326.

Retuning to 324, if it is determined that the first throttle obstruction was not detected at start up, the answer at 324 is NO and method 300 proceeds to 326.

At 326, method 300 includes performing a second throttle obstruction detection for detecting throttle captured icing conditions as discussed above. Briefly, second throttle obstruction or throttle captures icing conditions may occur when ice formed in a CAC-tube (during an overnight cold soak, for example) breaks free due to increased air flow through the CAC towards the throttle and intake manifold during engine operation and is captured by the throttle plate and/or the throttle bore. Thus, in one example, CAC is the source for the second throttle obstruction. Additionally or alternatively, the second throttle obstruction may occur when the ice formed on or around the throttle breaks free as a result of clearing routines and is subsequently captured by the throttle plate and/or throttle bore while air flow is inducted through the throttle valve. An example of second throttle obstruction is illustrated at FIG. 2E. Thus, the second throttle obstruction may occur after the engine starts up and while the vehicle is moving. For example, the second throttle obstruction may occur after the engine startup is complete when one or more icing conditions (e.g., vehicle cold soak conditions prior to start up that favor CAC ice formation, intake air charge temperature less than a threshold air charge temperature, etc.) discussed above are present. Accordingly, the second throttle obstruction detection may be performed after completion of engine start up and if the first throttle obstruction is absent or cleared if detected. In one example, the second throttle obstruction may be detected based on a throttle speed to achieve a desired rotation. Details of detecting the second throttle obstruction will be further elaborated with respect to FIG. 6.

Next, method 300 proceeds to 328. At 328, method 300 includes confirming if the second throttle obstruction is detected. The second throttle obstruction may be confirmed based on a status of a third flag indicating second throttle obstruction. For example, during second throttle obstruction detection, if the second throttle obstruction is detected, the third flag may be set to one. Otherwise, if the second throttle obstruction is not detected, the third flag may be set to zero. Thus, at 328, detection of second throttle obstruction may be confirmed based on the status of the third flag being one. Accordingly, if the answer at 328 is NO, the second throttle obstruction is not present and method 300 proceeds to 340. At 340, method 300 includes adjusting throttle position based on current torque demand. The method may subsequently end.

Returning to 328, if the answer at 328 is YES, the second throttle obstruction is present and method 300 proceeds to 330. At 330, method 300 includes performing an ice-passing routine. The ice passing routine may include opening the throttle from a current position to a fully open position, confirming the fully open position, and maintaining the throttle at the fully open position for a threshold duration while adjusting one or more engine operating parameters, such as spark timing, cylinder deactivation, and air-fuel ratio, to reduce excess torque and thereby, provide desired torque while allowing sufficient time for the ice to be swept by the intake air flow. Details of performing the ice passing routine will be further elaborated with respect to FIG. 7.

Upon performing the ice passing routine, method 300 proceeds to 332. At 332, method 300 includes judging if the second throttle obstruction is cleared. For example, the second throttle obstruction may be confirmed cleared based on a throttle rotation speed from a first position to a second position being at an expected throttle rotation speed or within a threshold limit above or below the expected throttle speed. The expected throttle rotation speed may be a predetermined throttle speed for a throttle angular displacement from the first position to the second position when a predetermined voltage is applied to the throttle motor. If the answer at 342 is NO, method 300 proceeds to 342 to repeat the ice-passing routine. Method 300 may then return to 332. In some examples, a counter may be maintained to monitor a number of times the ice passing routine is performed. If the number of times the ice passing routine is performed exceeds a threshold number, throttle mal function may be indicated.

If the answer at 332 is YES, method 300 proceeds to 334 to adjust throttle position based on torque demand. Method 300 may then end.

Figure 4:
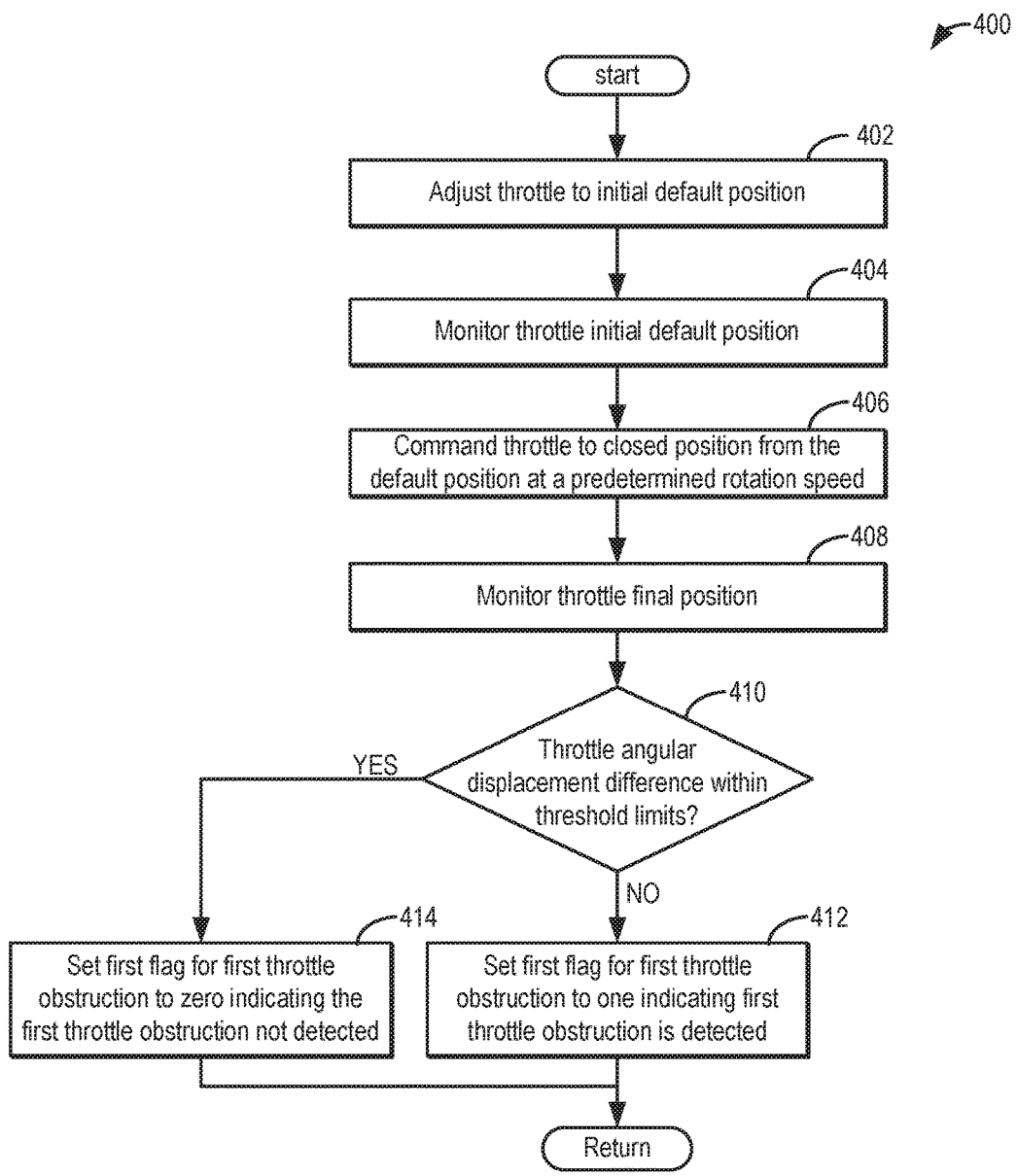
FIG. 4 shows a high-level flow chart illustrating an example routine for detecting throttle obstruction before engine start conditions.

FIG. 4 shows a flowchart illustrating an example method 400 for detecting first throttle obstruction. As discussed above, method 400 may be performed at or during engine start up before the engine start up process is completed and when icing conditions are present. For example, method 400 may be performed at engine startup in response to a status of an ignition key from an OFF state to an ON state by a vehicle operator. Additionally or alternatively, method 400 may be performed during engine startup when an engine coolant temperature is less than a threshold coolant temperature and when the accelerator pedal is not actuated. In some examples, method 400 may be performed before ignition key-on during a PCM wake up mode when a door switch is actuated. Method 400 may not be performed during hot start conditions, for example. In this example, the first throttle obstruction may be formation of ice on or around the throttle valve and/or throttle bore that causes the throttle to be jammed and therefore, prevents the throttle from moving and/or reaching a desired position at a predetermined throttle rotation speed. An example of the first throttle obstruction is shown at FIG. 2D.

Instructions for carrying out method 400 may be executed by a controller of the vehicle system, such as controller 12 at FIGS. 1A and 1B, based on instructions stored in non-transitory memory of the controller, and in conjunction with signals received from sensors of the vehicle system, such as the sensors described above with reference to FIGS. 1A-2E to detect the first throttle obstruction. The controller may employ actuators of the vehicle system, such as the actuators described with reference to FIGS. 1A-2E, to detect the first throttle obstruction and adjust vehicle operation, according to the methods described below. While described with reference to the systems depicted in FIGS. 1A-2E, it should be understood that method 400 or similar methods may be applied to other systems without departing from the scope of this disclosure.

Method 400 begins at 402. At 402, method 400 includes adjusting the throttle position to an initial default position. The default position may be a more closed position, wherein the throttle is not fully closed and has a threshold opening. The default position may allow for minimal engine functionality in an event of failure of a throttle motor, such as motor 25 at FIG. 1B, adjusting the throttle position. The controller may generate a signal or voltage in accordance with a predetermined motor torque profile to cause a throttle motor, such as throttle motor 25, to move a throttle plate, such as throttle plate 22, to a default position. Thus, adjusting the throttle position to the default position may include supplying a first predetermined voltage to the throttle motor to supply a predetermined motor torque to the throttle to move the throttle to the default position. The first predetermined voltage may be stored in the memory of the controller. It may be noted that the throttle may be at the initial default position at and during engine start up.

Next, method 400 proceeds to 404. At 404, method 400 includes determining and recording the initial default position. The initial default position may be determined based on an indication from a throttle position sensor, such as throttle position sensor 23. The controller may then save the initial default position in a memory of the controller as the initial position. The initial default position is also alternatively referred to herein as a first position of the throttle.

Next, method 400 proceeds to 406. At 406, method 400 includes commanding throttle to the closed position from the initial default position at a predetermined throttle rotation speed. Commanding throttle to the closed position from the initial default position includes supplying a second predetermined voltage to the throttle motor such that the throttle motor provides a closing torque to move the throttle from the initial default position to the fully closed position. The second predetermined voltage may be based on a voltage required to move an unobstructed throttle from the initial default position to the fully closed position. Said another way, the controller may command the throttle to move to a fully closed position by providing a signal to the throttle motor controlling the rotation of the throttle.

Next, method 400 proceeds to 408. At 408, method 400 includes monitoring the final throttle position. For an unobstructed throttle, the final throttle position is the fully closed position. However, when the throttle is obstructed due to ice formation on and/or around the throttle, the throttle may not move to the fully closed position. Thus, the final position may be determined by the throttle position sensor and saved to the memory of the controller as the final position.

Next, method 400 proceeds to 410. At 410, method 400 includes determining if a difference between throttle angular displacement from the initial position to the final position and a predetermined throttle angular displacement is within an error limit of the threshold difference. That is, it may be determined if the difference is within an upper limit above the threshold difference or within a lower limit below the threshold difference, the upper and lower limits determined taking into account throttle wear and tear. The predetermined throttle angular displacement may be retrieved from the controller memory. The predetermined angular displacement may be based on an angular displacement of an unobstructed throttle from the initial position to the final position. If the answer at 410 is YES, the first throttle obstruction that may prevent the throttle from fully closing is not detected and method 400 proceeds to 414 to clear the first flag for the first throttle obstruction. For example, if the first throttle obstruction is not detected, the first flag for the first throttle obstruction may be set to zero indicating that the first throttle obstruction is not detected. If the answer at 410 is NO, the first throttle obstruction is detected that causes the throttle to be jammed and prevents the throttle from moving to the fully closed position. Accordingly, method 400 proceeds to 412. At 414, method 400 includes setting the first flag for the first throttle obstruction. For example, if the first throttle obstruction is detected, the first flag for the first throttle obstruction may be set to one indicating that the first throttle obstruction is detected. The method may then return to step 310 at FIG. 3.

Figure 5:
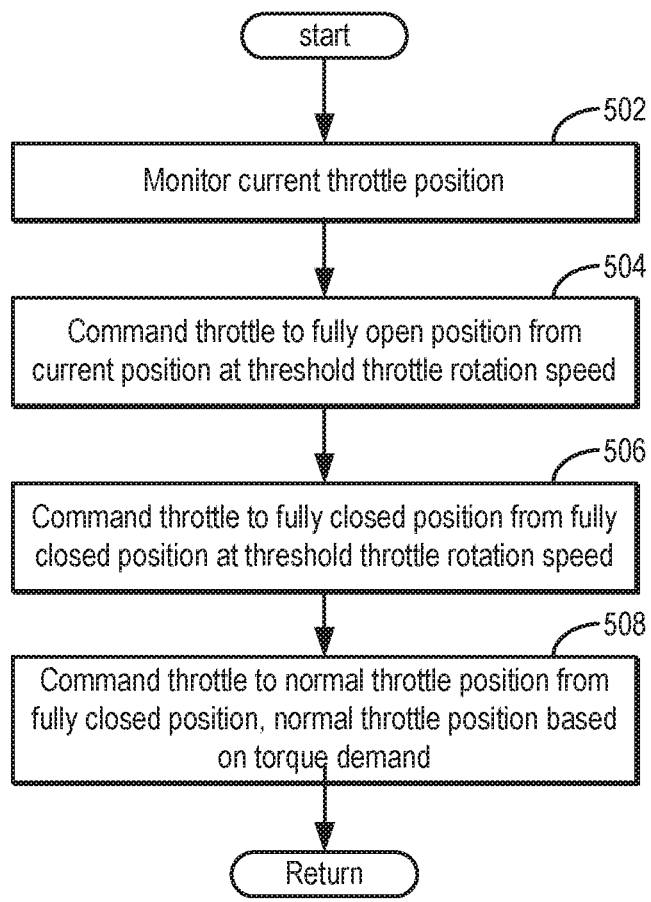
FIG. 5 shows a high-level flow chart illustrating an example routine for clearing a throttle obstruction detected before engine start conditions.

FIG. 5 shows a flowchart illustrating an example method for performing an ice-breaking routine. The ice-breaking routine may be performed in response to detecting the first throttle obstruction during engine start up conditions. The ice breaking routine may not be performed if the accelerator pedal is actuated and/or if the engine start up period is completed (which may be based on one or more of engine speed reaching idle speed, and engine coolant temperature reaching a threshold coolant temperature). As discussed above with respect to FIG. 3, the ice breaking routine may be performed in order to break ice formed on and/or around the throttle that prevents the throttle from reaching a desired opening position (e.g., an ice-jammed throttle, where the ice formed prevents the throttle from reaching the fully closed position). Instructions for carrying out method 500 may be executed by a controller of the vehicle system, such as controller 12 at FIGS. 1A-1B, based on instructions stored in non-transitory memory of the controller, and in conjunction with signals received from sensors of the vehicle system, such as the sensors described above with reference to FIGS. 1A-2E to remove the first throttle obstruction. The controller may employ actuators of the vehicle system, such as the actuators described with reference to FIGS. 1A-2E, to remove the first throttle obstruction and adjust vehicle operation, according to the methods described below. While described with reference to the systems depicted in FIGS. 1A-2E, it should be understood that method 500 or similar methods may be applied to other systems without departing from the scope of this disclosure.

Method 500 begins at 502. At 502, method 500 includes monitoring the throttle position. The throttle position may be determined based on an indication from the throttle position sensor. When the first throttle obstruction is present, the throttle may be stuck at the default position. Thus, in some examples the current throttle position may be the default position discussed above.

Next, method 500 proceeds to 504. At 504, method 500 includes commanding the throttle towards the fully open position from the current position at a threshold throttle rotation speed. For example, the threshold throttle rotation speed may be a maximum throttle speed. In order to achieve maximum throttle speed, the controller may supply a maximum voltage in an opening direction (also referred to as first direction herein) to the throttle motor. As a result, maximum torque may be delivered by the throttle motor to turn the throttle valve at maximum speed. By operating the throttle at maximum speed, high impact may be provided in the opening direction to break free from the ice.

Next, method 500 proceeds to 506. At 506, method 500 includes commanding the throttle towards the fully closed position at the threshold (maximum) rotation speed. By commanding the throttle to the fully closed position, the throttle may be accelerated towards the fully closed position, which provides impact in a closing direction (also referred to as second direction herein) to break free from the ice formed on and/or around the throttle. Commanding the throttle to the fully closed position includes supplying maximum voltage in the closing direction (second direction) to the throttle motor to turn the throttle valve in the opposite direction. By providing maximum voltage to the throttle motor, high impact may be provided to break away from the ice.

In this way, throttle motor may undergo torque reversals at maximum speed to move the throttle valve first in the closing direction and then in the opening direction to provide impact in the opening and closing directions to break free from the ice that is formed on or around the throttle valve.

In one example, a torque reversal cycle wherein the throttle valve is accelerated towards the closing direction from the current position and subsequently accelerated towards the opening direction may be performed for a threshold number of cycles.

While the above example illustrates commanding the throttle towards the fully open position and then commanding the throttle towards the fully closed position, it will be appreciated that examples wherein the throttle is first commanded to the fully closed position and subsequently commanded to the fully open position is also within the scope of the disclosure.

Next, method 500 proceeds to 508. At 508, method 500 includes returning the throttle to a desired throttle position from the fully open position, wherein the desired throttle position is based on torque demand.

Method may then return to step 316 at FIG. 3.

Figure 6:
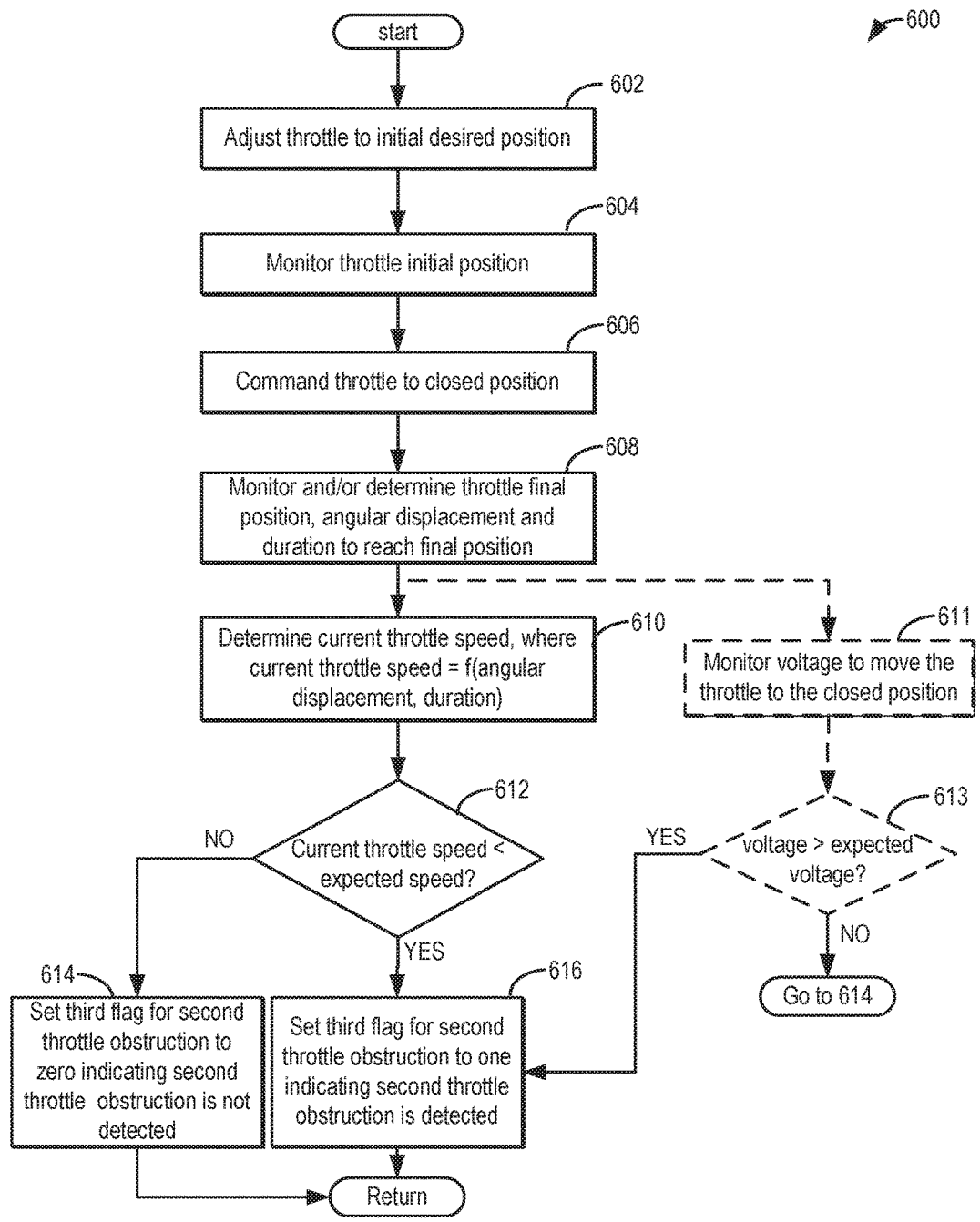
FIG. 6 shows a high-level flow chart illustrating an example routine for detecting CAC-based throttle obstruction.

FIG. 6 shows a flowchart illustrating an example method 600 for detecting second throttle obstruction. As discussed above, method 600 may be performed after the completion of engine start up. For example, method 600 may be performed when one or more of the following conditions are satisfied: engine speed stable at an idle speed following key ON event, accelerator pedal actuation initiated by an operator for a first time following the key ON event, engine coolant temperature at or above a threshold coolant temperature. Further, method 500 may be performed in response to detecting one or more icing conditions. If one or more icing conditions are not present, method 600 may not be performed. In this example, the second throttle obstruction is the throttle-captured icing condition discussed above with respect to FIG. 3. Thus the second throttle obstruction is different from the first throttle obstruction. While the first throttle obstruction is due to ice formed on and/or around the throttle that causes the throttle to be jammed and reduces throttle angular displacement, the second throttle obstruction may occur due to ice fragments (also referred to herein as ice slivers or ice particles) captured by the throttle plate and/or throttle bore, which may reduce throttle speed as a result the throttle may not reach a desired position within a desired duration. Further, while the first throttle obstruction may occur prior to engine start up when the vehicle is OFF, the second throttle obstruction may occur due to airflow in the intake that may cause ice fragments travelling through the throttle opening to be captured by the throttle. In one example, CAC may be a source of the ice fragments. For example, during cold soak conditions (long drive followed by a cold overnight soak), water collected in valleys in CAC may freeze. During engine operation following the cold soak, the ice formed in the CAC may break free due to increased air flow through the CAC and the resulting ice slivers may be captured by the throttle plate and/or bore when air flows from the CAC into the intake manifold via the throttle valve, resulting in the second throttle obstruction. In another example, during conditions when the throttle is obstructed with ice formed in and/or around the throttle valve, ice breaking routine may be performed wherein the throttle may be moved back and forth to break the ice and release the obstruction. During such conditions, when ice breaking routines are performed to remove the obstruction, the loosened ice particles that have broken free from the throttle may be captured by the throttle plate and/or throttle bore, resulting in the second throttle obstruction. Thus, the second throttle obstruction may have at least two sources, one from the ice formed within the CAC tubes and has broken free due to air flow through the CAC during engine operation, and another from ice that has formed on and/or around the throttle and has broken free as a result of ice-breaking procedures. In still further example, the throttle may capture ice particles broken loose after ice formation in the intake passage (e.g., intake passage 42) at one or more locations upstream of the throttle (upstream with reference to the direction of air flow from the ambient towards the engine). An example of the second throttle obstruction is shown at FIG. 2E.

Instructions for carrying out method 600 may be executed by a controller of the vehicle system, such as controller 12 at FIGS. 1A and 1B, based on instructions stored in non-transitory memory of the controller, and in conjunction with signals received from sensors of the vehicle system, such as the sensors described above with reference to FIGS. 1A-2E to detect the second throttle obstruction. The controller may employ actuators of the vehicle system, such as the actuators described with reference to FIGS. 1A-2E, to detect the second throttle obstruction and adjust vehicle operation, according to the methods described below. For example, the controller may employ a throttle motor, such as throttle motor 25 at FIG. 1B, to control rotation of the throttle via one or more gears to determine the second throttle obstruction. While described with reference to the systems depicted in FIGS. 1A-2E, it should be understood that method 600 or similar methods may be applied to other systems without departing from the scope of this disclosure.

Method 600 begins at 602. At 602, method 600 includes adjusting the throttle position to an initial desired position. The initial desired position may be based on a desired engine torque. The controller may generate a signal or voltage in accordance with a predetermined motor torque profile to cause a throttle motor, such as throttle motor 25, to move a throttle plate, such as throttle plate 22, to the initial desired position. Thus, adjusting the throttle position to the initial desired position may include supplying voltage to the throttle motor to supply a predetermined motor torque to the throttle to move the throttle to the initial desired position. In one example, the desired position may be a default position. As discussed above, the default position may be a more closed position, wherein the throttle is not fully closed and has a threshold opening.

Next, upon adjusting the throttle to the initial desired position, method 600 proceeds to 604. At 604, method 600 includes determining and recording the initial position. The initial position may be determined based on an indication from a throttle position sensor, such as throttle position sensor 23. The controller may then save the initial position in a memory of the controller as the initial position.

Next, method 600 proceeds to 606. At 606, method 600 includes commanding throttle to the closed position from the initial position. Adjusting throttle to the closed position includes supplying a predetermined desired voltage to the throttle motor such that the throttle motor provides a closing torque to move the throttle from the initial desired position to the fully closed position. The predetermined desired voltage may be based on the predetermined motor torque profile, for example. The predetermined desired voltage may be based on a voltage required to move an unobstructed throttle from the initial desired position to the final closed position.

Next, method 600 proceeds to 608. At 608, method 600 includes monitoring the final throttle position. The final throttle position is the fully closed position and may be determined by the throttle position sensor and saved to the memory of the controller as the final position. Further, at 608, method 600 may determine angular displacement of the throttle from the initial desired position to the final position and the duration to reach the final position from the initial position when the predetermined desired voltage is applied to the throttle motor.

Next, method 600 proceeds to 610. At 610, method 600 includes determining a current throttle speed to reach the final position from the initial position. For example, the current throttle speed may be a function of angular displacement of the throttle from the initial position to the final position and the duration to adjust the throttle from the initial position to the final position when the predetermined desired voltage is applied to the throttle motor by the controller.

Next, method 600 proceeds to 612. At 612, method 600 includes determining if the current throttle speed is less than an expected speed. The expected speed may be a predetermined value based on an unobstructed throttle movement from the initial position to the final position. The expected speed may also take into account a pressure difference across the throttle when the throttle is adjusted from the initial position to the final position. When a predetermined voltage is applied to the throttle motor to provide a desired torque to move the throttle from the initial position to the final position, the second obstruction caused by ice slivers breaking free from the CAC and/or ice formed on parts of the throttle and broken free may cause the throttle valve to turn more slowly than when the throttle is unobstructed. Thus, if it takes a longer duration than expected for the throttle to move from the initial position to the final position, the throttle rotation speed is less than expected and therefore, it may be inferred that the throttle is obstructed with ice. Accordingly, if the current throttle speed is less than the expected speed, the answer at 612 is YES, and method 600 proceeds to 616 to set the third flag for second throttle obstruction to one. For example, the third flag for the second throttle obstruction may be set to one indicating that the second throttle obstruction is detected. If the answer at 612 is NO, method 600 proceeds to 614. At 614, method 600 includes setting the third flag for the second throttle obstruction to zero indicating that the second throttle obstruction is not detected. Method 600 may then return to step 330 at FIG. 3.

In some examples, additionally or alternatively, the second throttle obstruction may be determined based on a voltage required (or current drawn) by the throttle motor to move the throttle from the initial position to the final position. For example, as shown at 611, a voltage (or a current drawn) to move the throttle from the initial position to the final position may be monitored. Subsequently, at 613, if the monitored voltage (or current) is greater than the expected voltage (or expected current), method may proceed to 616 to set the third flag to one to indicate that the second throttle obstruction is detected; otherwise, method 600 proceeds to 614 to set the third flag to zero to indicate that the second throttle obstruction is not detected. The method may then return to step 330 at FIG. 3.

In still further examples, when the throttle captures ice broken loose from the CAC or upstream of the throttle, the obstruction (that is, the captured ice particles) may prevent the throttle from reaching the fully closed position. In such cases, when the throttle is commanded by the controller to reach the fully closed position, the throttle attempts to close but cannot reach the fully closed position. Thus, the second throttle obstruction (that is, the throttle captured ice condition) may be detected after engine start up is completed based on whether the throttle reaches the fully closed position when the throttle is commanded to the fully closed position. For example, in order to detect the second throttle obstruction, a current initial position of the throttle may be recorded (based on indication from the throttle position sensor). Upon determining the initial position, the throttle may be commanded by the controller to the fully closed position, and then, after a threshold predetermined duration, the final position of the throttle may be recorded (based on indication from the throttle position sensor). Upon determining the final throttle position, the throttle angular displacement may be determined based on the initial position and the final position. The throttle angular displacement determined may be compared to an expected angular displacement. If a difference between the actual angular displacement and the expected angular displacement is not within a threshold error limit, it may be inferred that the throttle has not reached the fully closed position, and the second throttle obstruction may be indicated. It will be appreciated that while first throttle obstruction detection routine (discussed above with respect to FIG. 4) may be executed before or during engine start-up, the second throttle obstruction detection routine may be executed after the engine start-up is complete. Thus, even though similar detection routines (e.g., monitoring angular displacement as discussed with respect to the above example) may be performed for detecting the first and second throttle obstructions, the first and the second throttle obstructions may be distinguished based on one or more of when the detection routine is performed (before or during engine start up for detecting first throttle obstruction, versus after engine start-up is completed for the second throttle obstruction), and the difference between the expected and actual angular displacement. For example, the difference between the expected and actual angular displacement from the current initial position to the final fully closed position may be greater for the first throttle obstruction occurring due to ice formation on and/or around the throttle than the second throttle obstruction occurring due to the throttle capturing ice fragments or particles broken loose from an upstream location (upstream of the throttle with respect to the direction of air flow from the atmosphere to the engine) of the intake manifold.

Figure 7:
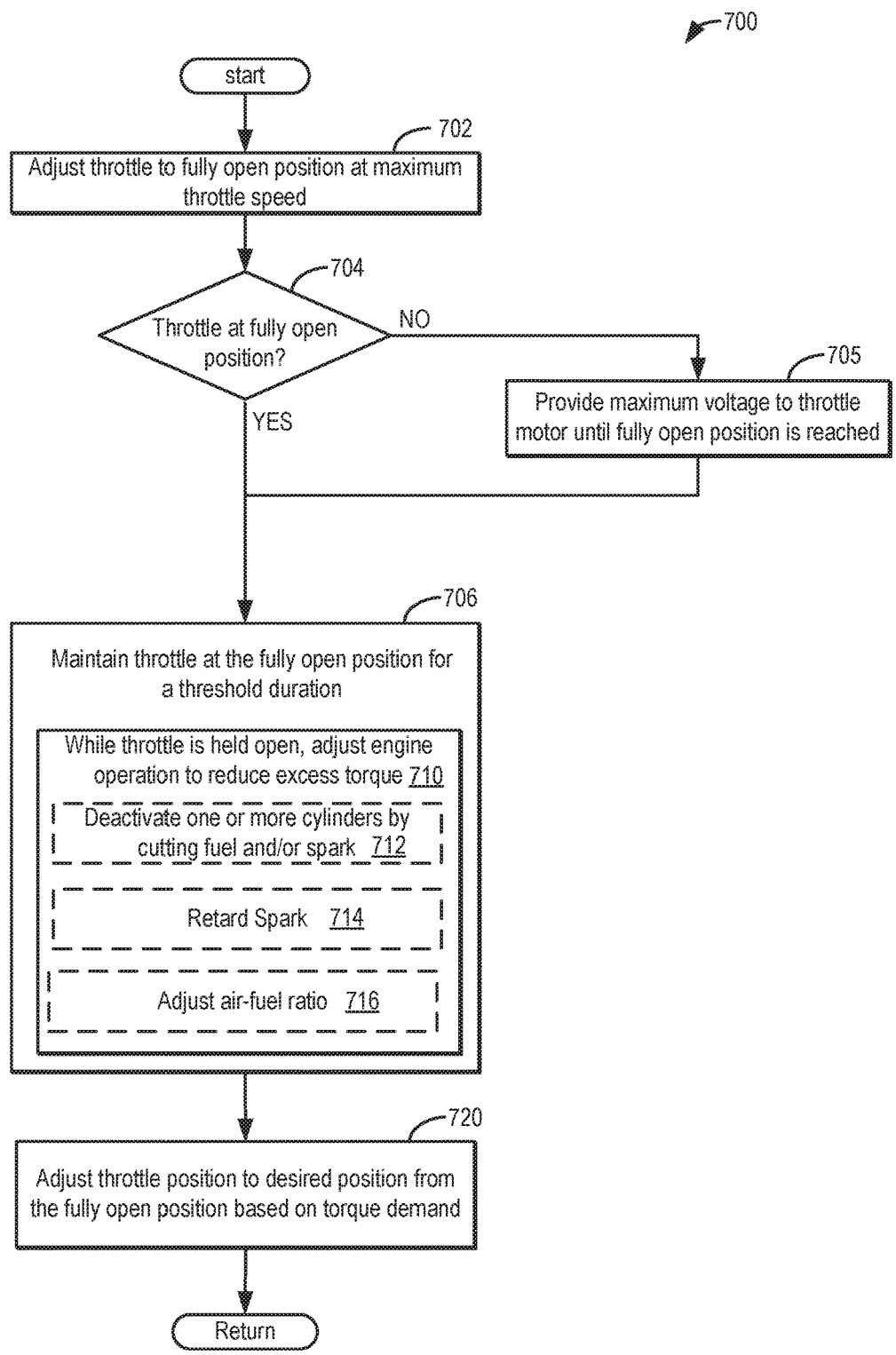
FIG. 7 shows a high-level flow chart illustrating an example routine for clearing a CAC-based throttle obstruction.
Figure 8:
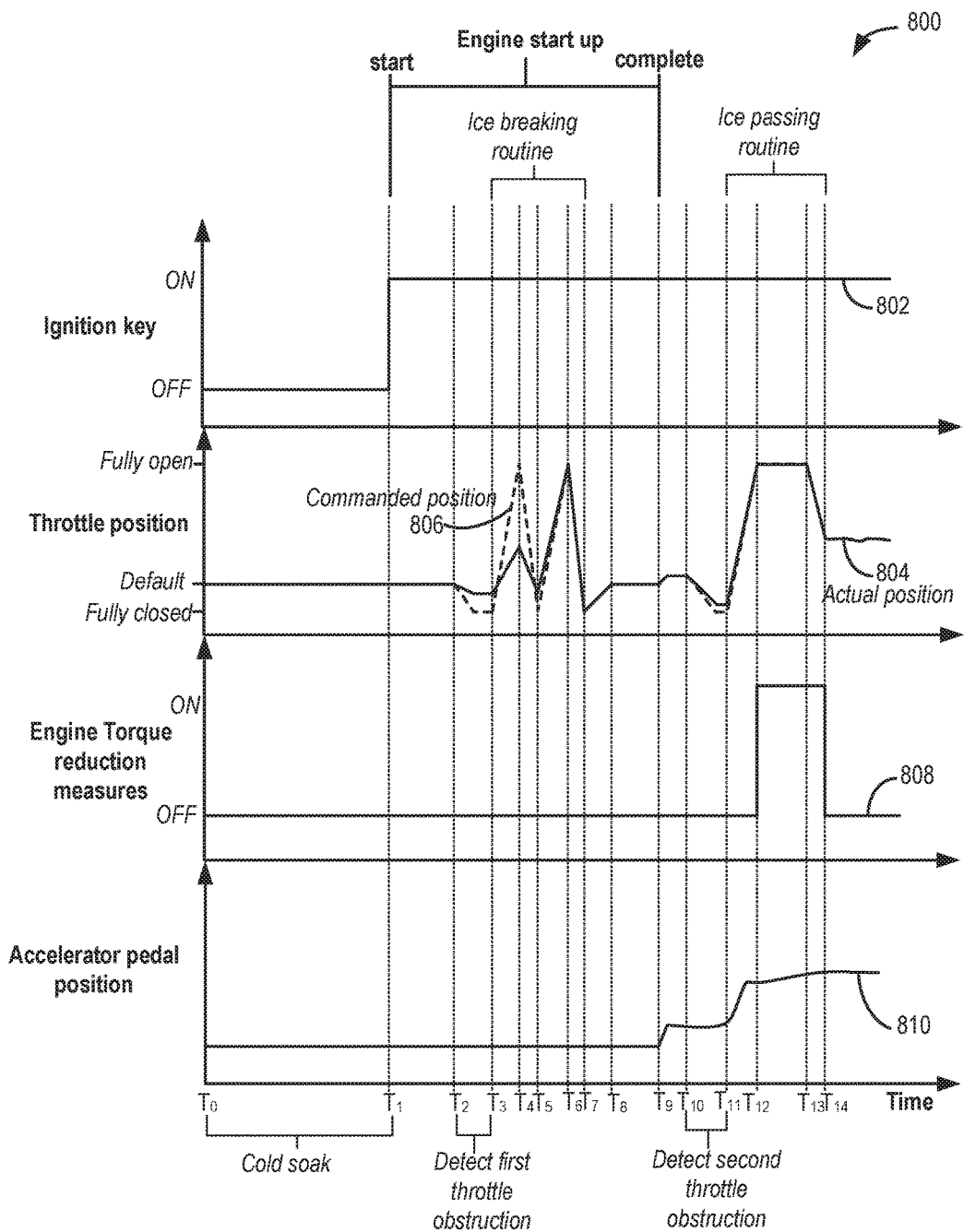
FIG. 8 is a graph of example adjustments for detecting throttle obstructions and clearing the detected obstructions.

FIG. 7 shows a flowchart illustrating an example method 700 for performing an ice-passing routine. The ice-passing routine may be performed in response to detecting the second throttle obstruction (discussed above with respect to FIG. 6) during engine operating conditions after the engine start up is completed. The ice passing routine may not be performed if the second throttle obstruction is not detected or if the engine start up period is not completed (which may be based on one or more of engine speed, engine coolant temperature, etc.). The ice passing routine discussed below may be performed in order to allow ice captured by the throttle bore and/or the throttle plate to pass through the throttle opening after the start up is completed. It will be appreciated that the instructions for carrying out method 700 may be executed by a controller of the vehicle system, such as controller 12 at FIGS. 1A-1B, based on instructions stored in non-transitory memory of the controller, and in conjunction with signals received from sensors of the vehicle system, such as the sensors described above with reference to FIGS. 1A-2E to remove the second throttle obstruction. The controller may employ actuators of the vehicle system, such as the actuators described with reference to FIGS. 1A-2E, to remove the second throttle obstruction and adjust vehicle operation, according to the method described below. While described with reference to the systems depicted in FIGS. 1A-2E, it should be understood that method 700 or similar methods may be applied to other systems without departing from the scope of this disclosure.

Method 700 begins at 702. At 702, method 700 includes adjusting the throttle to a fully open position from a current position at maximum throttle speed. The current position may be based on a current accelerator pedal position and thus, based on a current torque demand. Adjusting throttle to a fully open position at increased speed may include applying maximum voltage to the throttle motor to open the throttle to the fully open position. The direction of the voltage applied to the motor may be adjusted such that the throttle motor moves the throttle to the fully open position (opening direction). Fully operating the throttle at maximum speed may facilitate in fracturing the ice fragments captured by the throttle. In one example, the maximum throttle speed may be between 1500° to 2000° per second. In some examples, the maximum throttle speed may be 850° per second to protect the throttle hardware. Further, by adjusting the throttle to the fully open position, intake air flow rate may be increased, which may allow the captured ice fragments on the throttle to be swept into the intake manifold.

Next, method 700 proceeds to 704. At 704, method 700 includes confirming if the throttle position has reached the fully open position. For example, the fully open throttle position may be determined based on an indication from the throttle position sensor. If the fully open throttle position is confirmed, method 700 proceeds to 706. If the throttle has not reached the fully open throttle position, method 700 proceeds to 705 to continue to provide maximum voltage to the throttle motor until the fully open throttle position is reached.

At 706, upon confirming the fully open throttle position, method 700 includes maintaining the throttle at the fully open position for a threshold duration. The throttle may be maintained at the fully open position for the threshold duration by continuing to provide sufficient voltage to the throttle motor in the opening direction for the threshold duration after the throttle has reached the fully open position. In one example, in order to provide sufficient voltage, voltage may be increased to a maximum voltage. By maintaining the throttle at the fully open position, sufficient time is provided to allow the ice captured by the throttle plate and/or the bore to be swept into the intake by the increase in air flow. In one example, the threshold duration may be a predetermined value, such as 0.8 seconds. The some examples, the threshold duration may vary based on an amount of obstruction faced by the throttle due to captured ice. For example, the amount of obstruction may be based on the current throttle speed. If the obstruction is greater, the current throttle speed may be lower and accordingly, the threshold duration may be higher. Said another way, as a difference between the expected throttle speed and the current throttle speed increases, the threshold duration for which the throttle is maintained in the fully open state may increase. Further, as indicated at 710, while the throttle plate is held at the fully open position, any excess engine torque may be decreased by one or more of cylinder deactivation (712), spark retard (714), air-fuel ratio adjustment (716), and displacement reduction. Specifically, if cylinder deactivation is utilized to reduce torque, a number of cylinders to deactivate may be dependent amount of torque reduction desired. The cylinder deactivation may be performed by cutting fuel or spark or both spark and fuel. If spark retard is utilized to reduce engine torque, a degree of spark retard may be based on the amount of torque reduction desired. Further, adjusting air-fuel ratio may include providing a lean air-fuel ratio to reduce torque, where a degree of leanness is based on the amount of spark retard and the exhaust catalyst temperature limits. Further, in some examples, displacement of the engine may be reduced to reduce torque.

Next, method 700 proceeds to 720. At 720, method 700 includes adjusting throttle position to the desired position from the fully open position based on a current torque demand on the engine. The current torque demand may be based on a pedal position of the accelerator pedal.

The method may then return.

Turning next to FIG. 8, an example operating sequence for detecting a first obstruction, clearing the first throttle obstruction, detecting a second throttle obstruction, and clearing the second throttle obstruction is illustrated.

The sequence of FIG. 8 may be provided by the system of FIGS. 1A-2E, according to the method of FIGS. 3-7. FIG. 8 shows one example operation for the situation identified. In one example, the parameters shown illustrate operation that may occur only during the time periods identified, although modifications may be made, if desired.

Specifically, the first throttle obstruction may be detected as discussed above at FIGS. 3 and 4, the first throttle obstruction may be cleared by performing an ice breaking routine discussed above at FIGS. 3 and 5, the second throttle obstruction may be detected as discussed above at FIGS. 3 and 6, and the second throttle icing condition may be cleared by performing an ice-passing routine as discussed with respect to FIGS. 3 and 7. Thus, by performing the operating sequence of FIG. 8, different throttle obstructions may be detected and cleared.

Vertical markers are shown at times $T_0$-$T_{14}$ to identify particular times of interest during the sequence.

The first plot from the top of FIG. 8 represents ignition key position versus time. The Y axis represents an ON or an OFF ignition key position. The ignition key is ON when the signal is at a high level and the ignition key is OFF when the signal is at a low level.

The second plot from the top of FIG. 8 represents position of throttle, such as throttle 21 at FIGS. 1A-2E versus time. The Y axis represents the position of the throttle, and the position of the throttle changes from a fully closed position to a fully open position in the direction of the Y axis arrow. Trace 804 represents an actual throttle position based on output from a throttle position sensor, such as sensor 23 at FIGS. 1A and 1B. Trace 806 represents a commanded throttle position. The engine controller may send a command signal, such as signal 31 at FIG. 1B, to the throttle motor to command the throttle to a desired position based on the accelerator pedal position. The throttle position commanded by the controller is the commanded position. When the throttle is unobstructed (that is, when ice formation or ice captured condition is absent), the commanded position may be the actual position.

The third plot from the top of FIG. 8 represents an indication of engine torque reduction measures versus time. The engine torque reduction measures may include one or more of cylinder deactivation, spark retard, air-fuel ratio adjustment, and displacement reduction. The Y whether the torque reduction measures are ON (implemented) or OFF (not implemented) during the sequence. The one or more torque reduction measures are ON (implemented) when the signal is at a high level. The one or more torque reduction measures are OFF (not implemented) when the signal is at a low level.

The fourth plot from the top of FIG. 8 represents a position of accelerator pedal, such as accelerator pedal 130 at FIGS. 1A-1B versus time. The Y axis represents the position of the accelerator pedal, and the accelerator pedal depression in the direction of the Y axis arrow.

In all the plots discussed above, the X axis represents time and time increases from the left side of the plots to the right side of the plots.

At $T_0$ and between $T_0$ and $T_1$, the ignition key is in the OFF position. Therefore, the throttle is at the default position, wherein the throttle is not fully closed and has a threshold degree of opening (that is, the throttle is in a more closed position). Specifically, when the ignition key is in the OFF position, a throttle motor, such as motor 25 at FIGS. 1A and 1B, driving rotation of the throttle (and hence, controlling the position of the throttle) does not receive a voltage signal from a controller, such as controller 12 at FIGS. 1A and 1B. Said another way, the controller provides zero voltage to the throttle motor. Consequently, the throttle is at the default position. Further, between $T_0$ and $T_1$, the vehicle may be undergoing an overnight soak period at an ambient temperature below a threshold temperature (cold soak) after a threshold duration of engine operation prior to $T_0$, which may result in condensation within the CAC and throttle body. Further, the condensate formed within the CAC and the throttle body may freeze during the cold soak condition between $T_0$ and $T_1$. Since the throttle is at the default position when the vehicle is OFF, when the condensate within the throttle body freezes during the overnight cold soak, ice may form on and/or around the throttle at the default position causing the throttle to be stuck at the default position.

At $T_1$, the vehicle operator may adjust the ignition key from the OFF position to the ON position responsive to which the engine start up may be initiated. Further, responsive to the initiation of engine start up, at $T_1$, the controller may confirm that icing conditions are present based on the vehicle in cold soak period (cold soak conditions determined based on average ambient temperature below an average threshold temperature during the cold soak, ambient humidity greater than an average threshold humidity during the cold soak, and duration of cold soak), a previous driving distance during engine operation prior to $T_0$ greater than a threshold distance, a current ambient temperature below a threshold temperature (not shown), and a current ambient humidity above a threshold humidity. At $T_1$ and between $T_1$ and $T_8$, engine start up may be in progress. The engine start up may be determined to be in progress by the controller based on an engine speed profile following the key ON event. The engine speed may be determined based on an indication from a sensor, such as sensor 118 at FIG. 1A coupled to a crankshaft of the engine. For example, during start up, the engine speed may increase initially and subsequently decrease until a desired idle speed is reached. When the engine speed stabilizes to a desired idle speed, start up may be determined to be complete. Accordingly, engine start up may be confirmed based on an increase in engine speed above a threshold engine speed following the key ON. Additionally, engine start up may be further confirmed to be in progress based on an engine coolant temperature remaining below a threshold coolant temperature. Further, during the engine start up conditions, the accelerator pedal may not be actuated (810) and may remain in the released position during the engine start up period (between $T_1$ and $T_8$).

At $T_2$, and between $T_2$ and $T_3$, during engine start up conditions and upon confirming icing conditions as discussed above, the controller may determine if a first throttle obstruction is detected. In order to detect if the first throttle obstruction is present, the controller may command the throttle to a closed position from the default position and monitor a current angular displacement of the throttle between $T_2$ and $T_3$. For example, the controller may apply a first predetermined voltage to the throttle motor to command the throttle to move from the default position to the fully closed position (commanded throttle position indicated by trace 806). However, due to throttle being stuck at the default position as a result of office formed on and/or around the throttle during the cold soak conditions prior to $T_1$, the throttle may not reach the closed position from the default position (actual throttle position indicated by trace 804; actual throttle position not fully closed). Consequently, the current angular displacement of the throttle from the default position to the closed position is less than an expected angular displacement, wherein the expected angular displacement is based on an unobstructed throttle and may be predetermined and stored in a memory of the controller. For example, an expected throttle position profile (based on an indication from the throttle position sensor) with respect to an applied motor voltage may be stored in a look up table in a memory of controller. Based on the expected throttle position profile, the expected angular displacement of the throttle when the throttle is commanded from the default position to the closed position may be determined.

Responsive to determining that the current angular displacement is less than the expected angular displacement during engine start up conditions, the controller may confirm that the first throttle obstruction is detected. The first throttle obstruction wherein the throttle is jammed (or stuck) due to formation of ice on and/or around the throttle body and/or bore may also be referred to as the first throttle icing condition. While the present example shows detecting the first throttle icing condition during engine start-up, it will be appreciated that the first throttle icing condition may be detected prior to engine start-up (for example, during the period between unlocking the vehicle door and turning the ignition key ON).

At $T_3$, responsive to detecting the first throttle obstruction, the controller may initiate an ice breaking routine to clear the first throttle obstruction. Accordingly, at $T_3$, the controller may initiate a first torque reversal cycle (also referred to as first ice breaking cycle), wherein the controller may first command the throttle to a fully open position (806) in order to provide impact in the opening direction to break free from the ice (obstruction) and subsequently command the throttle to the fully closed position in order to provide impact in the opposite closing direction. Thus, the first ice breaking cycle includes rapidly oscillating the throttle valve by commanding the throttle valve to a fully open position and immediately commanding the throttle valve to a fully closed position. For example, the controller may apply a first voltage to the throttle motor in a first direction to command the throttle to the fully open position, and then the controller may apply a second voltage to the throttle motor in a second opposite direction to command the throttle to the fully closed position. Responsive to the controller command to move to the fully open position, the throttle may attempt to reach the fully open position between $T_3$ and $T_4$ (804). However, due to the presence of the first throttle obstruction, the actual throttle position (804) may not reach the fully open position at $T_4$. At $T_4$, the controller throttle may command the throttle to the fully closed position. Responsive to the controller command to move to the fully closed position at $T_4$, the throttle may move towards the fully closed position in the closing direction between $T_4$ and $T_5$. Due to the movement of the throttle in the closing direction between $T_4$ and $T_5$, the throttle may further break the ice. However, the impact may not be sufficient to break free from the ice. Accordingly, at $T_5$, the throttle may reach a more closed position (not fully closed position). Further, at $T_5$, the controller may determine that a difference between the actual throttle position and the expected throttle position is greater than a threshold difference indicating that the first throttle obstruction is not cleared. Responsive to determining that the first throttle obstruction is not cleared, the controller may initiate a second torque reversal cycle (also referred to as second ice breaking cycle) between $T_5$ and $T_7$ comprising commanding the throttle to the fully open position and subsequently commanding the throttle to the fully open position to clear the obstruction. As a result, the first throttle obstruction may be cleared. That is, the throttle may break free from the ice formed on and/or around the throttle during the cold soak conditions. At $T_8$, the throttle may return to the default position. In some examples, the torque reversal cycle may be performed for a threshold number of combustion events before checking if the first throttle obstruction is cleared. In other examples, the torque reversal cycle may be performed for a threshold number of times before checking again if the first throttle obstruction is cleared.

In this way, in response to detecting the first throttle obstruction at or during engine start up, ice breaking routine including torque reversals on the motor wherein the throttle is commanded to the fully open position and subsequently commanded to the fully closed position may be performed to fracture the ice that is formed on and/or around the throttle during vehicle cold soak conditions prior to engine start. Further, due to the ice breaking routines being performed during engine start up when the accelerator pedal is not actuated, engine torque reduction measures for reducing engine torque, for example, when the throttle is commanded to the fully open position, may not be performed.

Further, at $T_8$, the engine start up may be completed, which may be confirmed by the controller based on engine speed stabilizing at the idle speed, for example. Additionally, in some examples, the engine start up may be determined complete when the engine coolant temperature reaches a threshold temperature. Still further, in some examples, additionally, the engine start up may be determined complete when the accelerator pedal is actuated. Thus, at $T_8$, engine start up may be determined complete based on the engine speed reaching the idle speed (not shown) and accelerator pedal actuation by the vehicle operator.

Between $T_9$ and $T_{10}$, during engine operation after start up is completed, vehicle may be operating at a higher load (due to operator demanded torque increase resulting from accelerator pedal actuation, for example) than during the start up period. Accordingly, more air flow may be inducted through the CAC towards the engines between times $T_9$ and $T_{10}$ after the start up is completed. The increased air flow may cause the ice formed in the CAC to break free. The ice fragments that have broken free from the CAC may be captured by the throttle causing the second throttle obstruction. In some examples, additionally or alternatively to the fragments from the CAC, the ice that was formed on and/or around the throttle, and fractured during the ice breaking routine during the engine start up, may also be captured by the throttle during the engine operation, which may also result in the throttle captured icing conditions. Thus, responsive to completion of engine start up, after the engine start up, the controller may initiate a second throttle obstruction at $T_{10}$ to determine if the second throttle obstruction is detected. Accordingly, between times $T_{10}$ and $T_{11}$, the controller may command the throttle to fully closed position from the current position (wherein the current position is a desired position based on desired driver demanded torque and hence, based on accelerator pedal input) and monitor a throttle angular displacement from the current position to the fully closed position. Due to the throttle capturing ice, the throttle may not reach the fully closed position. Accordingly, at $T_{11}$, the controller may determine that a difference between the expected angular displacement and the actual angular displacement is not within a threshold error limit. As a result, the controller may determine that throttle is obstructed with captured ice, thereby detecting the second throttle obstruction. While the present example shows detecting the second throttle obstruction based on the difference between the expected and actual angular momentum, it will be appreciated that the second throttle obstruction may be detected by monitoring a throttle rotation speed. For example, the controller may monitor the throttle rotation speed when the throttle is commanded from the current position (wherein the current position is a desired position based on desired driver demanded torque and hence, based on accelerator pedal input) to the fully closed position. The controller may determine that the second throttle obstruction is present when it is determined that the throttle speed is less than an expected speed.

Responsive to the detection of the second throttle obstruction, the controller may perform an ice passing routine between $T_{11}$ and $T_{14}$ to clear the second throttle obstruction. Accordingly, at $T_{11}$, the controller may command the throttle to the fully open position from its current position at an increased throttle speed (commanded throttle position indicated by trace 806). Commanding the throttle to the fully open position from the current position may include providing a third voltage to the throttle motor in the first direction (opening direction). In one example, the increased throttle speed may be a maximum rotational speed of the throttle based on a maximum voltage that may be applied to the throttle motor. The increase in throttle speed when the throttle is moved to the fully open position may facilitate fracturing of the ice that is captured by the throttle.

At $T_{12}$, the controller may confirm that the throttle has reached the fully open position based on the indication from the throttle position sensor. Upon confirming that the throttle has reached the fully open position, the controller may command the throttle to maintain the throttle position at the fully open position for the threshold duration until $T_{13}$. While the throttle is held in the fully open position, between $T_{12}$ and $T_{13}$, excess engine torque may be reduced by performing one or more torque reduction measures including cylinder deactivation (e.g., by one or more of deactivating fuel injector, deactivating spark, deactivating intake valve, and deactivating exhaust valve on the cylinders selected for deactivation), spark retard from MBT, air-fuel ratio adjustment to provide a more lean air-fuel ratio than stoichiometry. In this way, by maintaining the throttle at the fully open position for the threshold duration during engine operation, throttle captured ice fragments may be forced to fracture and/or break free from the throttle due to increased air flow through the throttle when the throttle is held open. Further, by reducing the excess torque by one or more torque reduction measures discussed above, the desired torque may be achieved.

After the threshold duration of maintaining the throttle at the fully open position, at $T_{13}$, the controller may command the throttle to the desired position based on desired torque demand (that is, accelerator pedal position). Commanding the throttle to the desired position may include applying a fourth voltage to the throttle motor. At $T_{14}$, the throttle may reach the desired position. Further, at $T_{14}$, the controller may confirm that the throttle position is within a threshold limit of the desired position (based on indication from throttle position sensor) and may further confirm that the throttle has reached the desired position at the desired speed. As a result, at $T_{14}$, the controller may confirm that the second throttle obstruction is cleared.

In some examples, if at $T_{14}$, the second throttle obstruction is not cleared, the controller may repeat the ice passing routine wherein the throttle is adjusted to the fully open position from the desired position and maintained at the fully open position for the threshold duration to allow the captured ice fragments to pass through while maintaining the desired engine torque, and after the threshold duration has elapsed, the throttle is adjusted to the desired position based on the accelerator pedal position.

In this way, the first throttle obstruction is detected and cleared before engine start up is complete, and the second throttle obstruction is detected after the engine start up is complete.

While the above example illustrates, detecting the second throttle obstruction after clearing the first throttle obstruction, and then performing the ice passing routine responsive to detecting the second throttle obstruction, it will be appreciated that in some examples, the ice-passing routine (opening the throttle to fully open position, maintaining the throttle at the fully open position while maintaining desired torque) may be performed after confirming that the first throttle obstruction is cleared, and without performing the second throttle detection routine, in order to pass the ice that was broken by torque reversals during the ice breaking routine.

As one embodiment, a method for an engine includes in response to detecting a throttle obstruction, adjusting a throttle to a fully open position; maintaining the throttle at the fully open position for a threshold duration while maintaining a desired torque; and after the threshold duration, adjusting the throttle to a desired position, the desired position based on the desired torque; wherein the throttle obstruction is detected after engine start up. A first example of the method includes wherein the throttle obstruction is detected based on one or more of a current throttle rotation speed from the desired position to the closed position less than an expected speed and a voltage applied to a throttle motor to move the throttle from the desired position to the closed position greater than an expected voltage, the throttle motor coupled to the throttle and controlling rotation of the throttle. A second example of the method optionally includes the first example and further includes wherein maintaining the desired torque includes one or more of selectively deactivating one or more cylinders of the engine by disabling fueling to the one or more cylinders, retarding a spark timing from MBT, and providing a lean air fuel ratio. A third example of the method optionally includes one or more of the first and second examples, and further includes wherein detecting the throttle obstruction further includes determining if one or more throttle icing conditions are present; and wherein the one or more icing conditions include an ambient temperature less than a threshold temperature, an overnight soak condition, and a previous driving distance greater than a threshold distance. A fourth example of the method optionally includes one or more of the first through third examples, and further includes wherein the throttle obstruction is detected during an accelerator pedal actuated condition. A fifth example of the method optionally includes one or more of the first through fourth examples, and further includes, wherein the throttle obstruction is detected during engine operating conditions when an engine temperature is above a threshold temperature. A sixth example of the method optionally includes one or more of the first through fifth examples, and further includes, wherein maintaining the throttle at the fully open position for the threshold duration includes applying a threshold voltage to a throttle motor controlling the throttle and maintaining the threshold voltage for the threshold duration. A seventh example of the method optionally includes one or more of the first through sixth examples, and further includes, wherein adjusting the throttle to a fully open position includes moving the throttle from the desired position to the fully open position at a maximum throttle speed; and wherein adjusting the throttle to the fully open position further includes confirming that the throttle is at the fully open position based on an indication from a throttle position sensor coupled to the throttle. An eighth example of the method optionally includes one or more of the first through seventh examples, and further includes, wherein adjusting the throttle opening to the desired position after the threshold duration includes operating the throttle at a maximum throttle speed; and wherein adjusting the throttle to the desired position further includes confirming that the throttle is at the desired position based on an indication from a throttle position sensor coupled to the throttle. A ninth example of the method optionally includes one or more of the first through eighth examples, and further includes, in response to detecting a jammed throttle before engine start up when the one or more icing conditions are present, commanding the throttle to a fully open position and immediately commanding the throttle to a fully closed position.

As another embodiment, a method for a boosted engine includes during a first condition when an accelerator pedal is not actuated, in response to detecting a first obstruction of a throttle located downstream of a compressor and a charge air cooler in an intake of the engine, applying a first voltage in a first direction to a throttle motor coupled to the throttle to command the throttle to a fully open position and subsequently applying a second voltage in a second opposite direction to the throttle motor to command the throttle to a fully closed position; and during a second condition, in response to detecting a second obstruction of the throttle, applying a third voltage in the first direction to the throttle motor to command the throttle to the fully open position independent of the accelerator pedal position, maintaining the third voltage for a threshold duration to maintain the throttle at the fully open position for the threshold duration and subsequently applying a fourth voltage to the throttle motor in the second direction to command the throttle to a desired position, the desired position based on a current position of the accelerator pedal. A first example of the method includes wherein the first condition includes a key on event and an engine start up condition and the second condition includes an engine running condition after the engine start up is completed. A second example of the method optionally includes the first example and further includes wherein the first obstruction is detected based on a throttle angular displacement from a default position to a closed position less than a threshold angular displacement, and wherein the second obstruction is detected based on a throttle rotation speed from an initial position to the closed position less than a threshold speed, the initial position based on the current accelerator pedal position. A third example of the method optionally includes one or more of the first and second examples, and further includes maintaining a desired torque while maintaining the throttle at the fully open position during the second condition. A fourth example of the method optionally includes one or more of the first through third examples, and further includes, wherein maintaining the desired torque includes one or more of selectively deactivating one or more cylinders of the engine, retarding a spark timing from MBT, and providing a lean air fuel ratio. A fifth example of the method optionally includes one or more of the first through fourth examples, and further includes, during the first condition, repeating adjusting the throttle to a fully open position and subsequently applying the first voltage in the first direction to the throttle motor and subsequently applying the second voltage in the second direction until the first obstruction is cleared; and during the second condition, repeating applying the third voltage in the first direction to the throttle motor, maintaining the third voltage for the threshold duration, and subsequently applying the fourth voltage to the throttle motor in the second direction, until the second obstruction is cleared.

As another embodiment, a system for a vehicle includes an engine including an intake passage and one or more cylinders; a throttle within the intake passage; a throttle motor coupled to the throttle for adjusting a throttle position; a throttle position sensor coupled to the throttle for indicating the throttle position; a turbocharger including a compressor at least partially driven by an exhaust-driven turbine; a charge air cooler (CAC) positioned upstream of the throttle and downstream of the compressor; and a controller with computer readable instructions for: in response to detecting a first throttle obstruction at key ON before engine start, commanding the throttle from a first position to a second position and immediately commanding the throttle from the second position to a third position to clear the first throttle obstruction; and in response to detecting a second throttle obstruction while the engine is running, commanding the throttle from a fourth position to the second position, confirming that the throttle is at the second position based on an indication from the throttle position sensor, maintaining the throttle at the second position for a threshold duration while maintaining a desired torque, and commanding the throttle from the second position to a fourth position to clear the second throttle obstruction. A first example of the system includes wherein the a first amount of throttle opening when the throttle is at the first position is less than a second amount of throttle opening when the throttle is at the second position, and a third amount of throttle opening when the throttle is at the third position is less than the first and the second amounts; wherein a fourth amount of opening when the throttle is at the fourth position is based on an accelerator pedal position; and wherein maintaining the desired torque includes one or more of deactivating the one or more cylinders of the engine, retarding spark from MBT, decreasing a displacement of the engine, and adjusting an air-fuel ratio. A second example of the system optionally includes the first example and further includes wherein the first position is a default powered position, the second position is a fully open position, the third position is a fully closed position. A third example of the system optionally includes one or more of the first and second examples, and further includes wherein the first throttle obstruction is detected based on an angular displacement from the first position to the third position less than a threshold displacement; and wherein the second throttle obstruction is detected based on a throttle rotation speed from the fourth position to the third position less than the threshold speed.

In a representation, a method may also include, only in response to detecting icing of a throttle, rapidly traversing the throttle through open and closed oscillations to deviate the throttle from a desired torque or desired position, the desired throttle position based on engine starting throttle position requests. The desired torque may be based on an engine start-up setting in which the throttle is set to a relatively closed (as opposed to open) or fully closed position during the starting, which may include key on before cranking, cranking, etc. During this condition, the operator pedal command is one in which the operator pedal is not fully depressed, but is rather closer to or at foot off position. Otherwise, when the throttle is not oscillated, during this condition, the throttle is positioned based on the engine starting throttle command or desired position, which may be a table based on engine coolant temperature, air temperature, and/or engine combustion event number, starting from zero at the start and counting combustion events therefrom as they occur. Then, only after these oscillations have been performed and the routine confirms that the ice is broken (e.g., by monitoring that the throttle is able to achieve a desired range of motion through only a mid-range (e.g., staying a threshold distance away from both fully open and fully closed), the method may further include attempting (one or more times) to pass any broken ice that remains or is potentially trapped. During this operation, the method includes adjusting a throttle to a fully open position and maintaining the throttle at the fully open position only for a threshold duration while maintaining a desired torque. The method may also include after the threshold duration, adjusting the throttle to back to a desired position, the desired position based on the desired torque, idle RPM requests, an operator command (which now, as compared with the ice breaking operation), may be more than foot-off pedal, etc.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for a boosted engine, comprising:
during a first condition when an accelerator pedal is not actuated, in response to detecting a first obstruction of a throttle located downstream of a compressor and a charge air cooler in an intake of the engine, applying a first voltage in a first direction to a throttle motor coupled to the throttle to command the throttle to a fully open position and subsequently applying a second voltage in a second, opposite direction to the throttle motor to command the throttle to a fully closed position; and during a second condition, in response to detecting a second obstruction of the throttle, applying a third voltage in the first direction to the throttle motor to command the throttle to the fully open position independent of an accelerator pedal position, maintaining the third voltage for a threshold duration to maintain the throttle at the fully open position for the threshold duration and subsequently applying a fourth voltage to the throttle motor in the second direction to command the throttle to a desired position, the desired position based on a current position of the accelerator pedal.

2. The method of claim 1, wherein the first condition includes a key on event and an engine start up condition, and the second condition includes an engine running condition after the engine start up is completed.

3. The method of claim 1, wherein the first obstruction is detected based on a throttle angular displacement from a default position to a closed position less than a threshold angular displacement, and wherein the second obstruction is detected based on a throttle rotation speed from an initial position to the closed position less than a threshold speed, the initial position based on the current accelerator pedal position.

4. The method of claim 1, further comprising maintaining a desired torque while maintaining the throttle at the fully open position during the second condition.

5. The method of claim 4, wherein maintaining the desired torque includes one or more of selectively deactivating one or more cylinders of the engine, retarding a spark timing from MBT, and providing a lean air-fuel ratio.

6. The method of claim 1, further comprising, during the first condition, repeating adjusting the throttle to the fully open position and subsequently applying the first voltage in the first direction to the throttle motor and subsequently applying the second voltage in the second direction until the first obstruction is cleared; and during the second condition, repeating applying the third voltage in the first direction to the throttle motor, maintaining the third voltage for the threshold duration, and subsequently applying the fourth voltage to the throttle motor in the second direction, until the second obstruction is cleared.

* * * * *